US012307906B2

(12) United States Patent
Saccone et al.

(10) Patent No.: US 12,307,906 B2
(45) Date of Patent: May 20, 2025

(54) SYSTEMS, APPARATUS, AND METHODS FOR PROVIDING DATA FROM AN AIRCRAFT IN A COMPLIANT DATA FORMAT

(71) Applicant: The Boeing Company, Chicago, IL (US)

(72) Inventors: Gregory T. Saccone, Seattle, WA (US); Ryan D. Hale, Kent, WA (US); Michael Matyas, Monroe, MO (US); Louis J. Bailey, Covington, WA (US); Bradley D. Cornell, Moses Lake, WA (US)

(73) Assignee: The Boeing Company, Arlington, VA (US)

( * ) Notice: Subject to any disclaimer, the term of this patent is extended or adjusted under 35 U.S.C. 154(b) by 394 days.

(21) Appl. No.: 17/742,235

(22) Filed: May 11, 2022

(65) Prior Publication Data

US 2023/0368676 A1 Nov. 16, 2023

(51) Int. Cl.
*G08G 5/26* (2025.01)
*G08G 5/30* (2025.01)
*G08G 5/72* (2025.01)

(52) U.S. Cl.
CPC ................. *G08G 5/26* (2025.01); *G08G 5/30* (2025.01); *G08G 5/727* (2025.01)

(58) Field of Classification Search
CPC ..... G08G 5/0013; G08G 5/003; G08G 5/0082
See application file for complete search history.

(56) References Cited

U.S. PATENT DOCUMENTS

| | | | | |
|---|---|---|---|---|
| 9,824,591 | B1 * | 11/2017 | Ryan | G08G 5/0013 |
| 10,705,800 | B2 * | 7/2020 | Brunel | G06F 11/3604 |
| 2014/0257692 | A1 * | 9/2014 | Stefani | G08G 5/0069 701/519 |
| 2018/0213051 | A1 * | 7/2018 | Bang | H04N 7/18 |
| 2019/0147371 | A1 * | 5/2019 | Deo | G06N 20/20 706/12 |

* cited by examiner

*Primary Examiner* — Mary Cheung
(74) *Attorney, Agent, or Firm* — Kunzler Bean & Adamson

(57) ABSTRACT

Systems, apparatus, and methods for providing data in a pre-determined format with minimal impact from an aircraft to an interested entity are disclosed. One system includes a data processing system configured to store executable code to receive data, wherein the data is otherwise unavailable to the interested entity via pre-existing technology, determine, in real-time, one or more first devices on the aircraft where the data is stored in a format that is non-compliant with the pre-determined format and/or one or more second devices on the aircraft where the data can be generated in the format that is non-compliant with the pre-determined format, and retrieve the data in the format that is non-compliant with the pre-determined format from the at least one of the one or more first devices and the one or more second devices. Apparatus and methods that include and/or perform the operations of the system are also disclosed.

20 Claims, 14 Drawing Sheets

SYSTEMS, APPARATUS, AND METHODS FOR PROVIDING DATA FROM AN AIRCRAFT IN A COMPLIANT DATA FORMAT

FIELD

The subject matter disclosed herein relates to aircraft and more particularly relates to systems, apparatus, and methods that can provide data from an aircraft in a compliant data format.

BACKGROUND

While operating, aircraft are required to provide aircraft information to one or more ground systems over which they are flying. Traditionally, aircraft information is provided to a ground system by avionics aboard the aircraft, constrained by the static capabilities of the avionics. As the number of different types of ground systems increases, the number of different types and formats for transmitting and receiving the aircraft information correspondingly increases. As such, it may be difficult for an aircraft to support the aircraft information needs required by different ground systems located in different geographic areas because the types of information and format used by the different ground systems may be different from one another and/or different from what is typically used by the aircraft avionics.

BRIEF SUMMARY

The subject matter of the present disclosure provides examples of dynamic data format translation and corresponding systems and methods that overcome the above-discussed shortcomings of prior art techniques. There is a desire to utilize existing systems on an aircraft to provide data in a data format that is compliant with a data format used by a system when the aircraft otherwise uses a data format that is non-compliance with the data format used by the system. It would therefore be desirable to develop an improved system and method for providing data in a compliant data format. Accordingly, the subject matter of the present application has been developed in response to the present state of the art, and in particular, in response to shortcomings of conventional aircraft/ground system communications, and the conventional methods and systems for providing aircraft data to a system.

Disclosed herein is a system for providing data in a pre-determined format with minimal impact from an aircraft to an interested entity. The system includes a data processing system configured to store executable code. The executable code is configured to receive data, wherein the data is otherwise unavailable to the interested entity via pre-existing technology, determine, in real-time, one or more first on the aircraft where the requested data is stored in a format that is non-compliant with the pre-determined format, one or more second devices on the aircraft where the requested data can be generated in the format that is non-compliant with the pre-determined format, or a combination thereof, and retrieve the data in the format that is non-compliant with the pre-determined format from the at least one of the one or more first devices and the one or more second devices. The preceding subject matter of this paragraph characterizes example 1 of the present disclosure.

The executable code is further configured to determine a content of the received data and the content of the received data is determined utilizing at least one of predictive analysis, machine learning, and artificial intelligence. The preceding subject matter of this paragraph characterizes example 2 of the present disclosure, wherein example 2 also includes the subject matter according to example 1, above.

A request is received from a system of the interested entity and the executable code is further configured to convert, in real-time, the retrieved data into the pre-determined format in which the pre-determined format adheres to a protocol of the interested entity, and transmit the converted data with the pre-determined format to the system of the interested entity. The preceding subject matter of this paragraph characterizes example 3 of the present disclosure, wherein example 3 also includes the subject matter according to example 1, above.

The converted data comprises at least one of aircraft configuration data or aircraft flight data and the converted data is transmitted to the system of the interested entity while one of the aircraft is in flight or the aircraft is on a ground. The preceding subject matter of this paragraph characterizes example 4 of the present disclosure, wherein example 4 also includes the subject matter according to example 3, above.

A request for the data is received from a ground system associated with the aircraft and the executable code is further configured to transmit the retrieved data to the ground system associated with the aircraft. The preceding subject matter of this paragraph characterizes example 5 of the present disclosure, wherein example 5 also includes the subject matter according to example 1, above.

The ground system includes a second data processing system configured to store executable code. The code is configured to receive the retrieved data from the data processing system, convert, in real-time, the retrieved data into the pre-determined format, wherein the pre-determined format adheres to a protocol of the interested entity, and transmit the converted data with the pre-determined format to a second ground system of the interested entity. The preceding subject matter of this paragraph characterizes example 6 of the present disclosure, wherein example 6 also includes the subject matter according to example 5, above.

The converted data includes at least one of aircraft configuration data or aircraft flight data and the converted data is transmitted from the ground system associated with the aircraft to the second ground system of the interested entity while one of the aircraft is in flight or the aircraft is on a ground. The preceding subject matter of this paragraph characterizes example 7 of the present disclosure, wherein example 7 also includes the subject matter according to example 6, above.

The second data processing system forms at least a portion of a cloud-based system. The preceding subject matter of this paragraph characterizes example 8 of the present disclosure, wherein example 8 also includes the subject matter according to example 6, above.

The aircraft includes avionics, and the data processing system is configured to be one of located within the avionics and located external to the avionics. The preceding subject matter of this paragraph characterizes example 9 of the present disclosure, wherein example 9 also includes the subject matter according to example 1, above.

At least two portions of the data include different formats that are each non-compliant with the pre-determined format. The executable code is further configured to convert the at least two portions including the different formats that are each non-compliant with the pre-determined format to the pre-determined format and merge the at least two portions of the requested data in retrieving the requested data for transmission to the interested entity. The preceding subject matter of this paragraph characterizes example 10 of the present disclosure, wherein example 10 also includes the subject matter according to example 1, above.

The pre-determined format includes a Baseline 2 Automatic Dependent Surveillance-Contract (B2 ADS-C) format or other applicable format. The preceding subject matter of this paragraph characterizes example 11 of the present disclosure, wherein example 11 also includes the subject matter according to example 1, above.

Further disclosed herein is an apparatus for providing data in a pre-determined format with minimal impact from an aircraft to an interested entity. The apparatus includes a data management module that determines, in real-time, one or more first devices on the aircraft where the data is stored in a format that is non-compliant with the pre-determined format, one or more second devices on the aircraft where the data can be generated in the format that is non-compliant with the pre-determined format, or a combination thereof, a marshaller module that retrieves the data in the format that is non-compliant with the pre-determined format from the at least one of the one or more first devices and the one or more second devices, and a data aggregation module that converts, in real-time, the retrieved data into the pre-determined format in which the pre-determined format adheres to a protocol of the interested entity, and transmits the converted data with the pre-determined format to a ground system of the interested entity. The preceding subject matter of this paragraph characterizes example 12 of the present disclosure.

The marshaller module is further configured to determine a content of the data utilizing at least one of predictive analysis, machine learning, and artificial intelligence. The preceding subject matter of this paragraph characterizes example 13 of the present disclosure, wherein example 13 also includes the subject matter according to example 12, above.

The data aggregation module is further configured to determine that at least two first devices on the aircraft include different portions of the data that are each non-compliant with the pre-determined format, convert the different portions of the data to the pre-determined format, and merge the different portions of the data with the pre-determined format for transmission to the interested entity. The preceding subject matter of this paragraph characterizes example 14 of the present disclosure, wherein example 14 also includes the subject matter according to example 12, above.

The data aggregation module is further configured to determine that at least two second devices on the aircraft generate different portions of the data that are each non-compliant with the pre-determined format, convert the different portions of the data to the pre-determined format, and merge the different portions of the data with the pre-determined format for transmission to the interested entity. The preceding subject matter of this paragraph characterizes example 15 of the present disclosure, wherein example 15 also includes the subject matter according to example 12, above.

The data aggregation module is configured to transmit the converted data with the pre-determined format to a ground system of the interested entity while the aircraft is one of in flight or on a ground. The preceding subject matter of this paragraph characterizes example 16 of the present disclosure, wherein example 16 also includes the subject matter according to example 12, above.

Also disclosed herein is a method for providing data in a pre-determined format with minimal impact from an aircraft to an interested entity. The method includes determining, by a processor in real-time, one or more first devices on the aircraft where the data is stored in a format that is non-compliant with the pre-determined format, one or more second devices on the aircraft where the data can be generated in the format that is non-compliant with the pre-determined format, or a combination thereof, retrieving the data in the format that is non-compliant with the pre-determined format from the at least one of the one or more first devices and the one or more second devices, converting, in real-time, the retrieved data into the pre-determined format in which the pre-determined format adheres to a protocol of the interested entity, and transmitting the converted data with the pre-determined format to a ground system of the interested entity. The preceding subject matter of this paragraph characterizes example 17 of the present disclosure.

The method further includes determining a content of the data utilizing at least one of predictive analysis, machine learning, and artificial intelligence. The preceding subject matter of this paragraph characterizes example 18 of the present disclosure, wherein example 18 also includes the subject matter according to example 17, above.

The method further includes determining that at least two first devices on the aircraft include different portions of the data that are each non-compliant with the pre-determined format, converting the different portions of the data to the pre-determined format, and merging the different portions of data with the pre-determined format for transmission to the interested entity. The preceding subject matter of this paragraph characterizes example 19 of the present disclosure, wherein example 14 also includes the subject matter according to example 17, above.

The method further includes determining that at least two second devices on the aircraft generate different portions of the data that are each non-compliant with the pre-determined format, converting the different portions of the data to the pre-determined format, and merging the different portions of data with the pre-determined format for transmission to the interested entity. The preceding subject matter of this paragraph characterizes example 20 of the present disclosure, wherein example 15 also includes the subject matter according to example 17, above.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
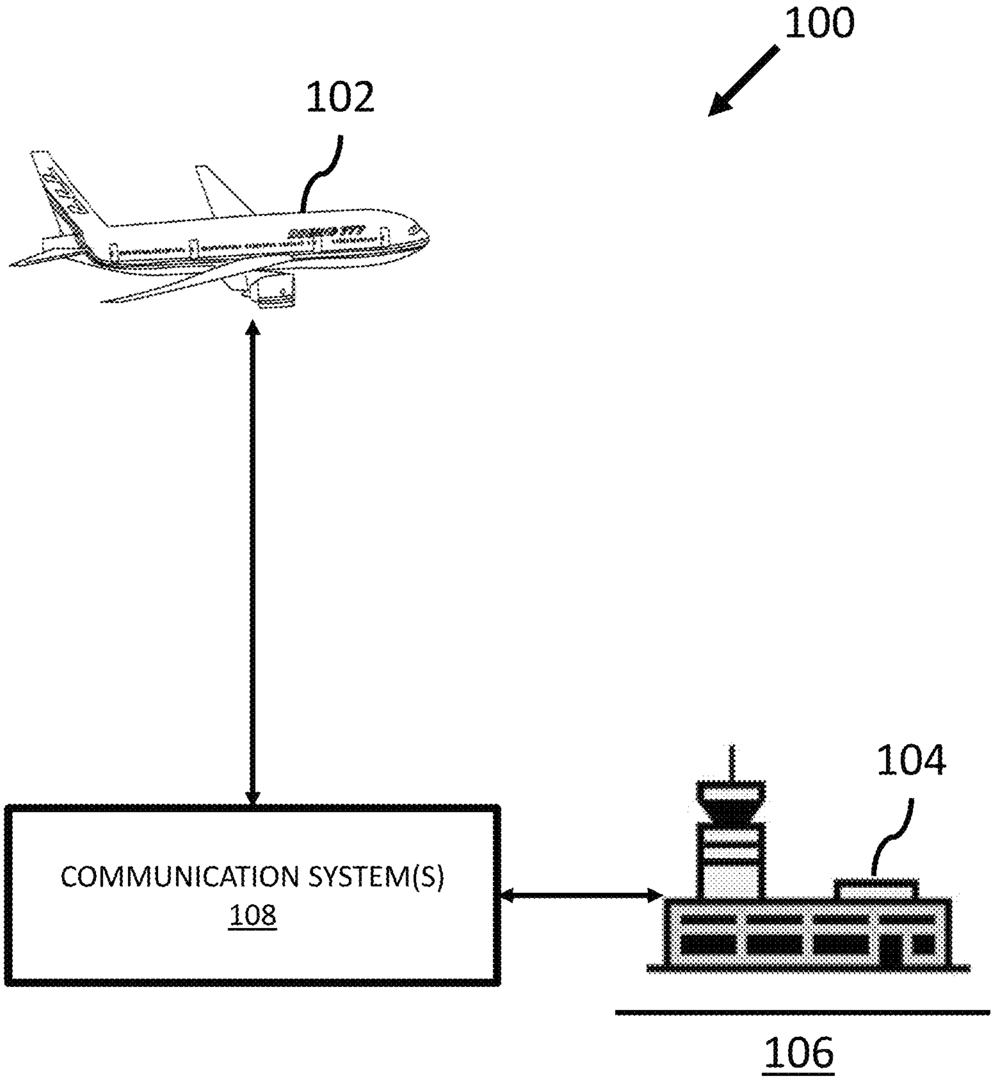
FIG. 1 is a schematic diagram of one embodiment of a system that can provide data from an aircraft in a compliant data format.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include a computer-readable storage medium or a plurality of computer-readable storage media. A computer-readable storage medium may include a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide systems, apparatus, methods, and computer program products that can provide data from multiple sources within an aircraft in a compliant format.

Various embodiments disclosed herein include systems for providing data in a pre-determined format with minimal impact from an aircraft to an interest entity (e.g., an aviation authority, an airline company, an owner of the aircraft, etc.). One system includes a first processor and a first memory device configured to store code executable by the first processor. The code causes the processor to receive, which can either be an external request, an internal request, trigger, or other mechanism to generate data, the data, wherein the data is otherwise unavailable to the interested entity via pre-existing technology, determine, in real-time, one or more first devices on the aircraft where the data is stored in a format that is non-compliant with the pre-determined format, one or more second devices on the aircraft where the data can be generated in the format that is non-compliant with the pre-determined format, or a combination thereof, and retrieve the data in the format that is non-compliant with the pre-determined format from the at least one of the one or more first devices and the one or more second devices.

In certain embodiments, the code is further executable by the processor to determine a content of the data and the content of the data is determined utilizing at least one of predictive analysis, machine learning, and artificial intelligence. In additional or alternative embodiments, the request is received from a system of the interested entity and the code is further executable by the processor to convert, in real-time, the retrieved data into the pre-determined format in which the pre-determined format adheres to a protocol of the interested entity, and transmit the converted data with the pre-determined format to the system of the interested entity. In further additional or alternative embodiments, the converted data includes at least one of aircraft configuration data or aircraft flight data and the converted data is transmitted to the system of the interested entity while one of the aircraft is in flight or the aircraft is on a ground. In additional or alternative embodiments, a request for the data is received from a first ground system associated with the aircraft and the code is further executable by the processor to transmit the retrieved data to the first ground system associated with the aircraft.

The first ground system, in some embodiments, includes a second processor and a second memory device configured to store code executable by the second processor. The code causes the second processor to receive the retrieved data from the first processor, convert, in real-time, the retrieved data into the pre-determined format, wherein the pre-determined format adheres to a protocol of the interested entity, and transmit the converted data with the pre-determined format to a second ground system of the interested entity. In further embodiments, the converted data includes at least one of aircraft configuration data or aircraft flight data and the converted data is transmitted from the first ground system associated with the aircraft to the second ground system of the interested entity while one of the aircraft is in flight or the aircraft is on a ground. In some further embodiments, the second processor and the second memory device of the system associated with the aircraft form at least a portion of a cloud-based system.

The aircraft, in certain embodiments, includes avionics and the first processor is configured to be one of located within the avionics and located external to the avionics. In additional or alternative embodiments, at least two portions of the requested data include different formats that are each non-compliant with the pre-determined format. Further, the code is executable by the first processor to convert the at least two portions including the different formats that are each non-compliant with the pre-determined format to the pre-determined format and merge the at least two portions of the data in retrieving the requested data for transmission to the interested entity. The pre-determined format, in some embodiments, includes a Baseline 2 Automatic Dependent Surveillance-Contract (B2 ADS-C) format.

Further disclosed herein are apparatuses for providing data in a pre-determined format with minimal impact from an aircraft to an interested entity. One apparatus includes a data management module that determines, in real-time, one or more first devices on the aircraft where the data is stored in a format that is non-compliant with the pre-determined format, one or more second devices on the aircraft where the requested data can be generated in the format that is non-compliant with the pre-determined format, or a combination thereof, a marshaller module that retrieves the data in the format that is non-compliant with the pre-determined format from the at least one of the one or more first devices and the one or more second devices, and a data aggregation module that converts, in real-time, the retrieved data into the pre-determined format in which the pre-determined format adheres to a protocol of the interested entity, and transmits the converted data with the pre-determined format to a system of the interested entity.

The marshaller module, in some embodiments, is further configured to determine a content of the data utilizing at least one of predictive analysis, machine learning, and artificial intelligence. In additional or alternative embodiments, the data aggregation module is further configured to determine that at least two first devices on the aircraft include different portions of the data that are each non-compliant with the pre-determined format, convert the different portions of the data to the pre-determined format, and merge the different portions of data with the pre-determined format for transmission to the interested entity.

In further additional or alternative embodiments, the data aggregation module is further configured to determine that at least two second devices on the aircraft generate different portions of the data that are each non-compliant with the pre-determined format, convert the different portions of the data to the pre-determined format, and merge the different portions of data with the pre-determined format for transmission to the interested entity. In certain embodiments, the data aggregation module is configured to transmit the converted data with the pre-determined format to a system of the interested entity while the aircraft is one of in flight or on a ground.

Also disclosed herein are methods for providing data in a pre-determined format with minimal impact from an aircraft to an interested entity. One method includes determining, by a processor in real-time, one or more first devices on the aircraft where the data is stored in a format that is non-compliant with the pre-determined format, one or more second devices on the aircraft where the requested data can be generated in the format that is non-compliant with the pre-determined format, or a combination thereof, retrieving the data in the format that is non-compliant with the pre-determined format from the at least one of the one or more first devices and the one or more second devices, converting, in real-time, the retrieved data into the pre-determined format in which the pre-determined format adheres to a protocol of the interested entity, and transmitting the converted data with the pre-determined format to a system of the interested entity.

In certain embodiments, the method further includes determining a content of the data utilizing at least one of predictive analysis, machine learning, and artificial intelligence. The method, in additional or alternative embodiments, further includes determining that at least two first devices on the aircraft include different portions of the data that are each non-compliant with the pre-determined format, converting the different portions of the data to the pre-determined format, and merging the different portions of data with the pre-determined format for transmission to the interested entity. In further additional or alternative embodiments, the method further includes determining that at least two second devices on the aircraft generate different portions of the data that are each non-compliant with the pre-determined format, converting the different portions of the data to the pre-determined format, and merging the different portions of data with the pre-determined format for transmission to the interested entity.

Turning now to the drawings, FIG. 1 is schematic block diagram illustrating one embodiment of a system 100 that can provide data from an aircraft in a compliant data format. The aircraft data is provided to an aviation authority in the compliant format because the aviation authority does not have access to the aircraft data via pre-existing technology and/or the data format used on the aircraft is not used by, different than, and/or is incompatible with the data format used by the aviation authority. At least in the embodiment illustrated in FIG. 1, a system 100 includes, among other components, an aircraft 102 and a system 104 located on the ground 106 (also referred to herein as, ground system 104) coupled to and/or in communication with each other via one or more communication systems 108.

The aircraft 102 and the ground system 104 utilize different data formats and/or data formats that are communicatively incompatible with one another, at least when the aircraft 102 initially comes into contact with and/or attempts to begin communicating with the ground system 104. Additionally, the data types needed by the ground system 104 may not be available by the standard and/or stock avionics and/or applications on the aircraft 102. The various embodiments disclosed herein enable and/or allow an aircraft 102 (or aircraft 602 (see, FIGS. 6 and 7)) to provide the required types of data stored in and/or generated in the aircraft 102 to the ground system 104 in a data format that is the same as and/or compatible with the data format used by and/or requested by the ground system 104. In other words, the various embodiments disclosed herein can provide the data stored in and/or generated in the aircraft 102 to the ground system 104 in one or more requested data formats, which can include a unified and/or generic data format (e.g., a Baseline 2 Automatic Dependent Surveillance-Contract (B2 ADS-C) format and/or other applicable formats (e.g., Flight Information Exchange Model (FIXM), Weather Information Exchange Model (WIXM), Aeronautical Information Exchange Model (AIXM), etc.), etc., among other data formats that are possible and contemplated herein).

In some embodiments, the aircraft 102 provides the data stored in and/or generated in the aircraft 102 to the ground system 104 in response to receiving a request from the ground system 104 to provide the data to the ground system 104. In additional or alternative embodiments, the aircraft 102 automatically and/or automatedly provides the data stored in and/or generated in the aircraft 102 to the ground system 104. In certain embodiments, the aircraft 102 automatically and/or automatedly provides the data stored in and/or generated in the aircraft 102 to the ground system 104 in response to determining, detecting, and/or identifying that a trigger event has occurred and/or is about to occur. Additionally, the system 100 provides airline operations control (AOC) to, for example, establish data connections between the aircraft 102 and the ground system 104 without requiring flight deck (e.g., pilot(s)) and ground operator interactions.

An aircraft 102 may include any suitable vehicle and/or device capable of flight. Example aircraft 102 include, but are not limited to, an airplane (e.g., a jet airplane, a propeller airplane, a glider airplane, etc.), a helicopter, an unmanned/uncrewed aerial vehicle (UAV), a drone, a rocketship, a spaceship, a space shuttle, an airship, a blimp, a flying car, etc., among other aerial vehicles and/or aerial devices capable of flight that are possible and contemplated herein. At least in the example embodiment illustrated in FIG. 1, the aircraft 102 is a jet airplane manufactured by The Boeing Company of Chicago, Illinois, although the discussion herein is applicable to any and/or all of the non-limiting examples of an aircraft 102.

Figure 2:
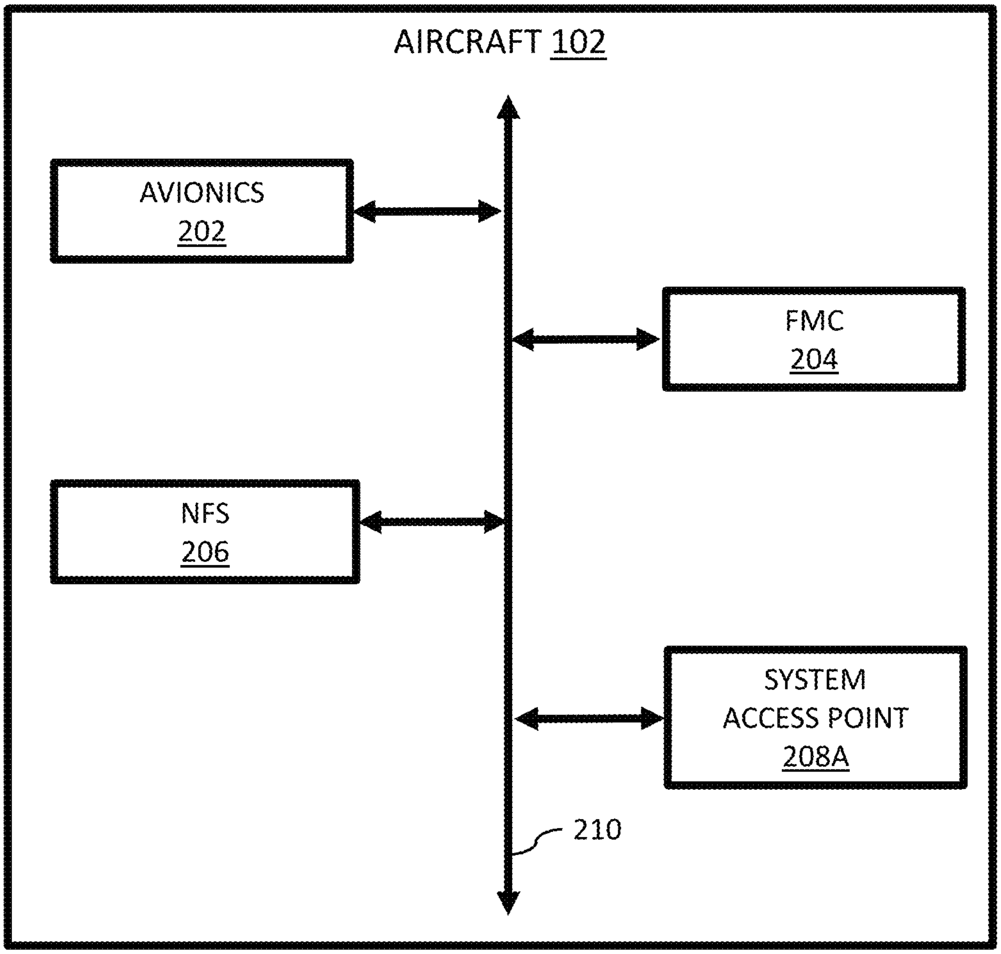
FIG. 2 is a schematic block diagram of one embodiment of an aircraft included in the system of FIG. 1.

FIG. 2 illustrates a block diagram of one embodiment of an aircraft 102 included in the system 100 of FIG. 1. At least in the embodiment illustrated in FIG. 2, the aircraft 102 includes, among other components, a set of aircraft avionics 202 (or simply avionics 202), a flight management computer 204 (e.g., FMC 204), a network file server 206 (e.g., NFS 206), and a system access point 208A coupled to and/or in communication with one another via a bus 210 (e.g., a wired and/or wireless bus).

The avionics 202 may include any suitable electronic system(s), electronic device(s), and/or software program(s)/routine(s)/application(s) that can be used on an aircraft 102. That is, the avionics 202 may include any suitable hardware and/or software that is capable of operating on and/or providing one or more functions on an aircraft 102. As such, various embodiments of the avionics 202 may include any suitable avionic system(s), avionic device(s), and/or avionic software program(s)/routine(s)/application(s) that is/are known or developed in the future.

An FMC 204 may include any suitable hardware and/or software that is capable of performing the operations and/or functions of an FMC 204 discussed herein. That is, various embodiments of an FMC 204 may include any flight management computer and/or type of flight management computer that is known or developed in the future. As used herein, an FMC 204 may also include any auxiliary hardware, software, and/or computing device(s) that contribute to flight management function(s) (e.g., a distributed FMC 204).

In certain embodiments, the FMC 204 is configured to generate and/or store flight plan data for the aircraft 102, which can include any suitable flight plan data that is known or developed in the future. The flight plan data can include, for example, one or more routes from the origin to the destination of a flight, performance information about the aircraft (e.g., gross weight, fuel weight, center of gravity, etc.), altitude information during the flight (e.g., takeoff/landing slope(s), cruising altitude(s), etc.), projected/anticipated trajectories including, but not limited to, waypoint type(s), position(s), estimated time of arrival(s), altitude(s), airspeed(s), modifications to the flight plan, special/specialized flight plans (e.g., search patterns, rendezvous points/positions, in-flight refueling orbits and/or locations, object release points/positions, etc.), etc., among other flight plan data that is possible and contemplated herein.

In additional or alternative embodiments, the FMC 204 is configured to generate and/or receive position data for the aircraft 102 and ensure the accuracy of the position data. In certain embodiments, the position data is received from an external global positioning system (GPS) and/or generated by GPS and/or other navigation system(s) on the aircraft 102.

The FMC 204, in further additional and/or alternative embodiments, is configured to generate guidance data for the aircraft 102, which can include pitch axis data and/or throttle control data for the aircraft 102, among other data that is possible and contemplated herein. In some embodiments, the FMC 204 is configured to calculate a course to follow during a flight based on the flight plan, the current position, and/or configuration of the aircraft 102. In certain embodiments, the guide data is generated using a lateral navigation (LNAV) function for the lateral portion of a flight plan and a vertical navigation (VNAV) function for the vertical portion of a flight plan.

The NFS 206 may include any suitable hardware and/or software that can store data, transfer data between the avionics 202, and/or facilitate data transfer between the avionics 202. That is, the NFS 206 can transfer data between and/or facilitate data transfer between one or more electronic systems, one or more electronics devices, and/or one or more software program(s)/routine(s)/application(s) included in the avionics 202 (e.g., publish/subscribe and/or request/response functions/operations, etc.). In some situations, the predetermined data format and/or standard data format used by the NFS 206 and/or the aircraft 102 is not used by the ground system 104 and/or is incompatible with the data format used by the ground system 104, or the type of data requested by the ground system 104 is not available from the standard/stock avionics on the aircraft 102, as discussed elsewhere herein.

In various embodiments, the NFS 206 may store any suitable data that is used on and/or generated in the aircraft 102 and/or used by and/or generated by the FMC 204. In certain embodiments, the NFS 206 is configured to store data related to the type of avionics 202 and/or other systems, devices, and/or equipment included in the aircraft 102.

The data stored in and/or generated by the NFS 206 may include any suitable data type and/or data format that is known and/or developed in the future. In certain embodiments, the data stored in and/or generated by the NFS 206 includes a predetermined data format and/or standard data format.

The NFS 206, in various embodiments, may transfer and/or facilitate transfer of any suitable data that is used on and/or generated in the aircraft 102 and/or used by and/or generated by the FMC 204. In certain embodiments, the NFS 206 is configured to transfer and/or facilitate transfer of the data related to the type of avionics 202 and/or other systems, devices, and/or equipment included in the aircraft 102.

In some embodiments, the NFS 206 is configured to host and/or include one of more software applications used on an aircraft 102. The NFS 206 can host/include any suitable quantity, type(s) of applications, and/or particular application(s) that are known or developed in the future. Example applications include, but are not limited to, an Engine Trim Balance application, a Weight and Balance application, a LogBook Application, and/or a virtual Quick Access Recorder (QAR) application, etc., among other quantities, types of application, and/or particular applications that are possible and contemplated herein.

The data stored in and/or generated by the NFS 206 may be transferred and/or the transfer of which may be facilitated using any suitable data transfer/communication protocol(s) that is/are known and/or developed in the future capable of exchanging data and/or generating data in an aircraft 102. Moreover, the data stored in and/or generated by the NFS 206 may be transferred and/or the transfer of which may be facilitated using any suitable data transfer/communication technique(s) that is/are known and/or developed in the future that can exchange data and/or generate data in an aircraft 102.

A system access point 208A (or Aircraft Interface Device (AID) or onboard network system (ONS)) may include any suitable electronic system, set of electronic devices, software, and/or set of applications capable of performing the operations and/or functions disclosed herein. In various embodiments, a system access point 208A may include any suitable hardware and/or software that can provide data from an aircraft 102 and/or facilitate providing data from the aircraft 102 in a compliant data format. In certain embodiments, the system access point 208A can provide data from an aircraft 102 and/or facilitate providing data from the aircraft 102 to a ground system 104 in a data format that is used by the ground system 104 and/or that is compliant with the data format used by the ground system 104.

Figure 3:
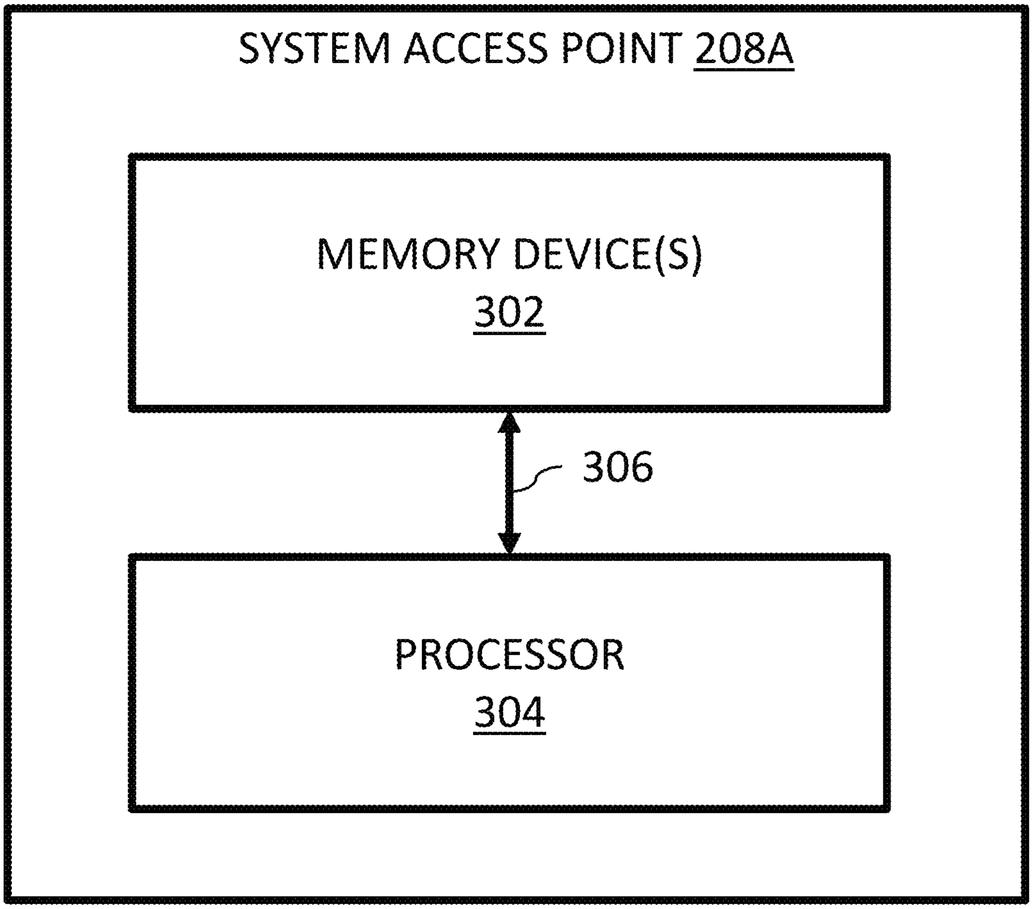
FIG. 3 is a schematic block diagram of one embodiment of a system access point included in the aircraft of FIG. 2.

Referring to FIG. 3, one embodiment of a system access point 208A is illustrated. At least in the illustrated embodiment, the system access point 208A includes, among other components and/or features, a set of memory devices 302 and a processor 304 coupled to and/or in communication with one another via a bus 306 (e.g., a wired and/or wireless bus 306 and/or interprocess communication).

A set of memory devices 302 may include any suitable quantity of memory devices 302. Further, a memory device 302 may include any suitable type of device and/or system that is known or developed in the future that can store computer-useable and/or computer-readable code. In various embodiments, a memory device 302 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 304).

A memory device 302, in some embodiments, includes volatile computer-readable storage media. For example, a memory device 302 may include random-access memory (RAM), including dynamic RAM (DRAM), synchronous dynamic RAM (SDRAM), and/or static RAM (SRAM). In other embodiments, a memory device 302 may include non-volatile computer-readable storage media. For example, a memory device 302 may include a hard disk drive, a flash memory, and/or any other suitable non-volatile computer storage device that is known or developed in the future. In various embodiments, a memory device 302 includes both volatile and non-volatile computer-readable storage media.

Figure 4:
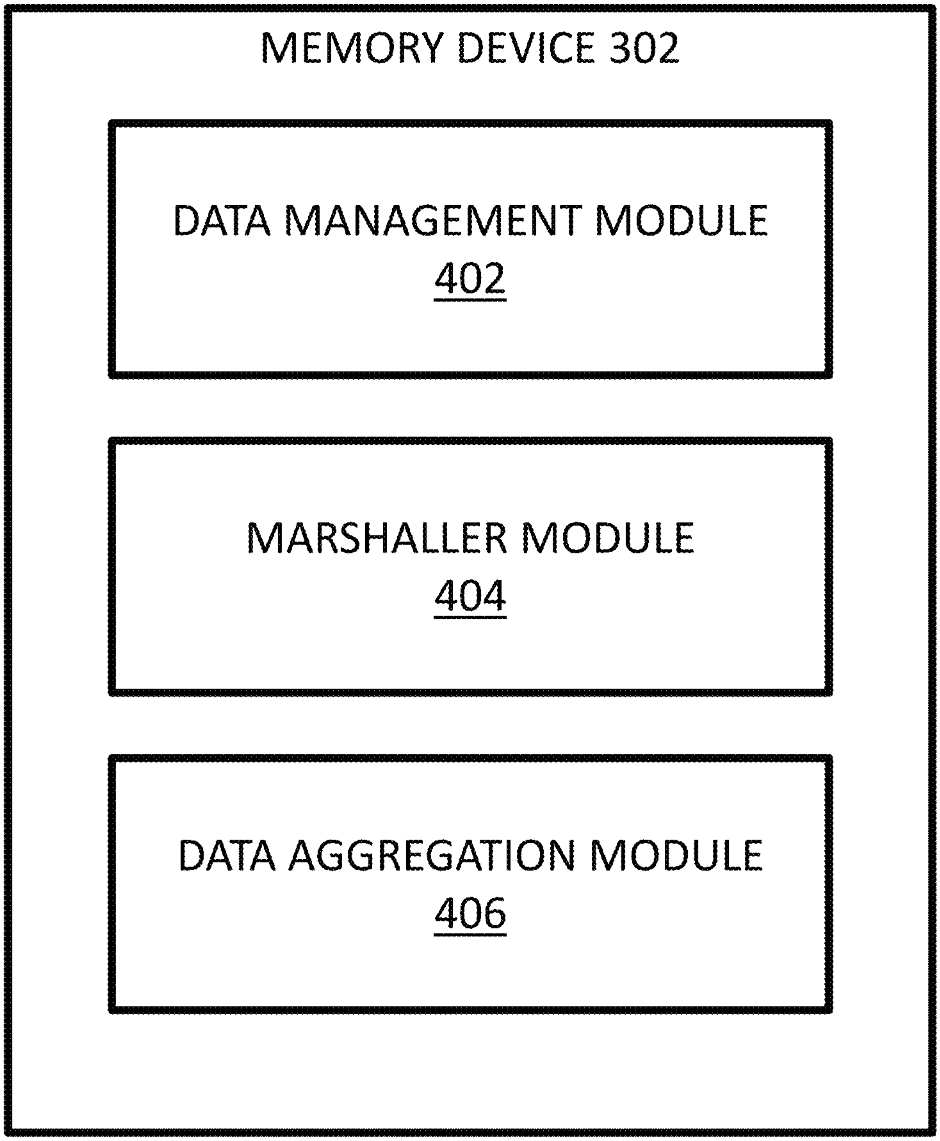
FIG. 4 is a schematic block diagram of one embodiment of a memory device included in the system access point of FIG. 3.

With reference now to FIG. 4, a schematic block diagram of one embodiment of a memory device 302 is illustrated. At least in the embodiment illustrated in FIG. 4, the memory device 302 includes, among other components, a data management module 402, a marshaller module 404, and a data aggregation module 406 that are each configured to cooperatively operate/function with one another when executed by the processor 304 to provide data from an aircraft 102 and/or facilitate providing data from the aircraft 102 in a compliant data format.

A data management module 402 may include any suitable hardware and/or software that can manage data stored in and/or generated in an aircraft 102. In various embodiments, a data management module 402 is configured to receive one or more requests for data stored in an aircraft 102 and/or generated in the aircraft from a ground network 104. In some embodiments, the requested data will identify the particular data requested by the ground system 104 and the data management module 402 is configured to know where the requested data is stored and/or accessed (e.g., an avionics bus, etc.) in the aircraft 102 and/or where the requested data can be generated in the aircraft 102 (e.g., avionics 202, FMC 204, NFS 206, and/or system access point 208, etc.).

The data management module 402 is configured to transmit a notification to the marshaller module 404 that identifies the requested data and the location(s) of the requested data. A marshaller module 404 is configured to receive the notification from the data management module 402 indicating what data to retrieve and where the data is located and/or where the data can be generated.

A marshaller module 404 may include any suitable hardware and/or software that can retrieve the data identified by the data management module 402, predict what data may be included in a request received from the ground network 104 and retrieve the predicted data, and manage any data retrieved by the marshaller module 404.

The marshaller module 404, in certain embodiments, is configured to retrieve all of the data identified by the data management module 402. That is, the marshaller module 404 is configured to locate all of the identified data (e.g., the storage location(s) of the data and/or location(s) where the data can be generated) and retrieve the data from the storage and/or access location(s) and/or location(s) where the data is generated and/or can be generated.

In additional or alternative embodiments, the marshaller module 404 is configured to predict what data is being requested by the ground system 104 and/or may be requested by the ground system 104. In various embodiments, the marshaller module 404 uses one or more predictive analysis algorithms, routines, and/or techniques, one or more machine learning algorithms, routines, and/or techniques, and/or one or more artificial intelligence (AI) algorithms, routines, and/or techniques, etc., to determine what data is being requested and/or may be requested by the ground system 104, among other algorithms, routines, and/or techniques that are possible and contemplated herein. Here, the marshaller module 404 is configured to coordinate with the data management module 402 to determine the location(s) where the predicted data is located, accessible, and/or generated.

A predictive analysis algorithm, routine, and/or technique may include any suitable predictive analysis algorithm, routine, and/or technique that is known or developed in the future capable of determining what data is being requested in a request received from the ground system 104. In some embodiments, a predictive analysis algorithm, routine, and/or technique is configured to determine what data is being requested in a request received from the ground system 104 based on historical requests from the ground system 104. That is, a predictive analysis algorithm, routine, and/or technique can, based on one or more historical requests for data received from a particular ground system 104 and/or one or more similar/related ground systems 104, determine/predict what data is being requested in a request received from a ground system 104.

A machine learning algorithm, routine, and/or technique may include any suitable machine learning algorithm, routine, and/or technique that is known or developed in the future capable of determining what data is being requested in a request received from a ground system 104. In some embodiments, a machine learning algorithm, routine, and/or technique is configured to determine what data is being requested in a request received from a ground system 104 based on historical requests from the ground system 104. That is, a machine learning algorithm, routine, and/or technique can, based on one or more historical requests for data received from a particular ground system 104 and/or one or more similar/related ground systems 104, determine/learn what data is being requested in a request received from a ground system 104.

An AI algorithm, routine, and/or technique may include any suitable AI algorithm, routine, and/or technique that is known or developed in the future capable of determining what data is being requested in a request received from the ground system 104. In some embodiments, an AI algorithm, routine, and/or technique is configured to determine what data is being requested in a request received from the ground system 104 based on historical requests from the ground system 104. That is, an AI algorithm, routine, and/or technique can, based on one or more historical requests for data received from the particular ground system 104 and/or one or more similar/related ground systems 104, determine/predict/learn what data is being requested in a request received from the ground system 104.

In various embodiments, the marshaller module 404 is configured to know and/or predict when to get the requested data. That is, the predictive analysis algorithm(s), routine(s), and/or technique(s), machine learning algorithm(s), routine(s), and/or technique(s), and/or AI algorithm(s), routine(s), and/or technique(s) are configured to know and/or predict when to get the requested data based on specific adaption data and/or one or more queries/subscriptions for accessing the requested data.

In certain embodiments, the marshaller module 404 is configured to minimize extraneous queries for data and/or maximize collaborative usage of the retrieved data via the predictive analysis, machine learning, and/or AI. That is, the marshaller module 404 includes and/or implements the one or more predictive analysis algorithms, routines, and/or techniques, one or more machine learning algorithms, routines, and/or techniques, and/or one or more AI algorithms, routines, and/or techniques, etc., to minimize extraneous queries for data and/or to maximize collaborative usage of the predicted and retrieved data, among other algorithms, routines, and/or techniques that are possible and contemplated herein.

In various embodiments, the marshaller module 404 is configured to store any data retrieved from the various sources (e.g., avionics 202, FMC 204, NFS 206, and/or system access point 208A, etc.). Further, the marshaller module 404 is configured to transmit a notification to the data aggregation module 406 in response to retrieving the requested data. In some embodiments, the notification from the marshaller module 404 can include the data retrieved by the marshaller module 404.

A data aggregation module 406 is configured to receive the notification from the marshaller module 404, which can include the data retrieved by the marshaller module 404. A data aggregation module 406 may include any suitable hardware and/or software that can process all of the data received from the marshaller module 404 and transmit the processed data to the ground system 104.

In processing the data received from the marshaller module 404, the data aggregation module 406 is configured to combine the data and translate the combined data to the data format used in/by the ground system 104. In other words, the data aggregation module 406 is configured to translate the data format used/stored in the aircraft 102 to the data format used in/by the ground system 104 and/or to a data format that is compatible with the data format used in/by the ground system 104.

The data format of the combined data may include any suitable data format that is known or developed in the future. As discussed elsewhere herein, the data format of the combined data may include a standard format, among other data formats that are possible and contemplated herein.

The data format of the ground system 104 may include any suitable data format that is known or developed in the future. Examples data formats that the ground system 104 includes/uses include, but are not limited to, a B2 ADS-C format and/or a other format, etc., among other data formats that are possible and contemplated herein.

As such, certain embodiments of the data aggregation module 406 are configured to translate the data from the standard format used in the aircraft 102 to the B2 ADS-C format used by the ground system 104. In certain additional or alternative embodiments, the data aggregation module 406 is configured to translate the data from the standard format used in the aircraft 102 to any data format used by the ground system 104. Other embodiments of the data aggregation module 406 are configured to translate the data from the standard format used in the aircraft 102 to one or more other data formats used by a particular ground system 104.

In some embodiments, the data aggregation module 406 is configured to enforce one or more user-level protocol rules for an aircraft-side application. The user-level protocol(s) may include any suitable user-level protocol(s) that are known or developed in the future. Similarly, the rule(s) for the user-level protocol(s) may include any suitable rule(s) that are known or developed in the future. Moreover, the aircraft-side application(s) may include any suitable aircraft-side application(s) that are known or developed in the future.

In certain embodiments, the data aggregation module 406 is configured to determine that at least two of the avionics 202, FMC 204, and NFS 206 include and/or store different portions of the requested data that are each non-compliant with the pre-determined format. Here, the data aggregation module 406 is configured to translate (convert) the different portions of the requested data to the data format used by the ground system 104 and merge/combine the different portions of requested data with the data format used by the ground system 104 for transmission to the ground system 104 (e.g., aviation authority).

In additional or alternative embodiments, the data aggregation module 406 is configured to determine that at least two of the avionics 202, FMC 204, and NFS 206 generate different portions of the requested data that are each non-compliant with the pre-determined format. Here, the data aggregation module 406 is configured to translate (convert) the different portions of the requested data to the data format used by the ground system 104 and merge/combine the different portions of requested data with the data format used by the ground system 104 for transmission to the ground system 104 (e.g., aviation authority).

The data aggregation module 406, in various embodiments, is configured to transmit the data that has been combined and translated to the data format used by/in the ground system 104 and/or that is compatible with the data format used by/in the ground system 104 to the ground system 104. The combined and translated data may be transmitted to the ground system 104 in response to one or more requests for the data from the ground system 104 and/or automatically/automatedly transmitted to the ground system 104 (e.g., based on a prediction). The combined and translated data may be automatically/automatedly transmitted to the ground system 104 in response to detecting the occurrence of a trigger event and/or determining that a trigger event is about to occur, as discussed elsewhere herein.

A trigger event may include any suitable predetermined event and/or characteristic that is known or developed in the future. Example trigger events include, but are not limited to, a predetermined geographic location and/or border, a predetermined altitude, a predetermined amount of flight time, a predetermine amount of time before takeoff, a predetermined time of time after landing, a predetermined airspeed, a predetermined flight slope, a predetermined weight, a predetermined number of persons onboard, a change in a parameter value by more than a configurable tolerance, etc., among other events and/or characteristics that are possible and contemplated herein.

Referring back to FIG. 3, a processor 304 may include any suitable non-volatile/persistent hardware and/or software configured to perform and/or facilitate performing functions and/or operations for providing data from an aircraft 102 in a compliant data format. In various embodiments, the processor 304 includes hardware and/or software for executing instructions in one or more modules and/or applications that can perform and/or facilitate performing functions and/or operations for providing data from an aircraft 102 in a compliant data format. The modules and/or applications executed by the processor 304 for providing data from an aircraft 102 in a compliant data format can be stored on and executed from one or more memory devices 302 and/or from the processor 304.

Figure 5:
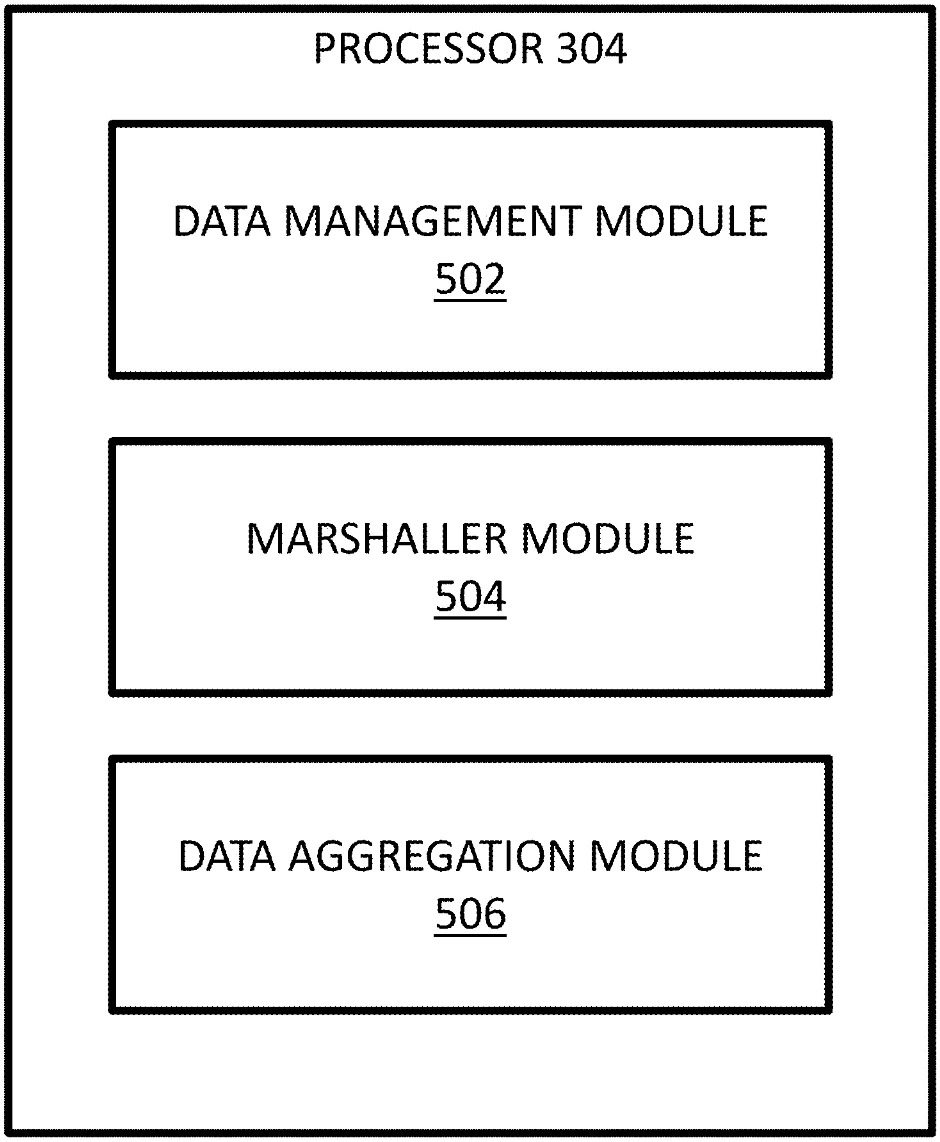
FIG. 5 is a schematic block diagram of one embodiment of a processor included in the system access point of FIG. 3.

With reference to FIG. 5, a schematic block diagram of one embodiment of a processor 304 is shown. At least in the illustrated embodiment, the processor 304 includes, among other components, a data management module 502, a marshaller module 504, and a data aggregation module 506 that are each configured to cooperatively operate/function with one another when executed by the processor 304 to provide data from an aircraft 102 in a compliant data format similar to the data management module 402, marshaller module 404, and data aggregation module 406 discussed with reference to the memory device 302 illustrated in FIG. 4.

Referring again to FIG. 1, a ground system 104 may include any suitable ground system 104 that is known or developed in the future. The ground system 104 may be located in any geographic region, country and/or jurisdiction. In some embodiments, the ground system 104 may be owned, controlled by, and/or subject to control by any suitable aviation authority that is known or developed/organized in the future (e.g., United States Federal Aviation Authority (FAA), European Aviation Safety Agency (EASA), Transport Canada Civil Aviation (TCCA), Civil Aviation Administration of China (CAAC), etc., among other countries and/or aviation authorities that are possible and contemplated herein). In other embodiments, the ground system 104 may be owned, controlled by, and/or subject to control by any suitable public entity and/or private entity, including, for example, an airline company, an airline manufacturer, and an owner of an aircraft, etc., among other suitable public and/or private entities that are possible and contemplated herein. As used herein, the term, "interested entity," may include an aviation authority, a public entity, and/or a private entity, as disclosed herein.

Various embodiments of a ground system 104 are configured to transmit signals and/or requests to an aircraft 102 for data when the aircraft 102 is on the ground 106 and/or is in flight. The data requested by the ground system 104 may include any suitable data capable of being stored in and/or generated by one or more systems, devices, and/or software program(s)/routine(s)/application(s) (e.g., avionics 202, FMC 204, NFS 206, system access point 208A, etc.) in an aircraft 102 (e.g., aircraft data).

Further, various embodiments of a ground system 104 are configured to receive signals and/or replies from an aircraft 102 including the data requested by the ground system 104 in the data format used by/in the ground system 104 and/or in a data format that is compatible with the data format used by/in the ground system 104.

A ground system 104 may use any suitable data format that is known or developed in the future. Example data formats that may be used by a ground system 104 include, but are not limited to, a B2 ADS-C format and/or other data format(s), etc., among other data formats that are possible and contemplated herein.

In at least some situations, the data format used by an aircraft 102 is different from and/or incompatible with the data format used by the ground system 104. As disclosed herein, various embodiments of an aircraft 102 store data and/or generate data in a format that is different from and/or incompatible with the data format used by/in a ground system 104, translate the data stored in and/or generated by the aircraft 102 to one or more data formats used by the ground system 104 and/or that is compatible with the data format(s) used by/in the ground system 104, and provide the data stored in and/or generated by an aircraft 102 in the same format as the ground system 104 and/or in a data format that is compliant with the data format used by/in the ground system 104. In certain embodiments, the aircraft 102 stores data and/or generates data in a particular format, which can be any suitable data format (e.g., a standard data format), translates the data stored in and/or generated by the aircraft 102 from the data format of the aircraft (e.g., a standard format) to the B2 ADS-C format and/or a data format that is compatible with the B2 ADS-C format and/or other format because the ground system 104 uses the B2 ADS-C format and/or other format, and transmits the data stored in and/or generated by the aircraft 102 in the B2 ADS-C format and/or other data format to the ground system 104, among other data formats used by an aircraft 102 and/or ground system 104 that are possible and contemplated herein.

In FIG. 1, a communication system 108 may include any suitable communication system(s) that is/are known or developed in the future. That is, the communication system(s) 108 may include any one or more systems, one or more devices, and/or one or more software program(s)/routine(s)/application(s) that can enable and/or allow an aircraft 102 and a ground system 104 to communicate, propagate signals, and/or exchange data, and/or transmit/receive requests with each other.

Examples of a communication system 108 include, but are not limited to, one or more satellite communication systems, one or more cellular communication systems, and/or one or more communication networks, etc., among other systems that are capable of enabling/allowing an aircraft 102 and a ground system 104 to communicate with one another. A communication network can include any suitable wired and/or wireless network (e.g., public and/or private computer networks in any number and/or configuration (e.g., the Internet, an intranet, a cloud network, etc.)) that is known or developed in the future that can enable/allow and/or facilitate enabling/allowing an aircraft 102 and a ground system 104 to be coupled to and/or in communication with one another and/or to share resources. In various embodiments, a communication network can include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or sets of computing systems/devices connected together for the purpose of communicating with one another that are possible and contemplated herein.

In various embodiments, a communication system 108 is configured to transmit requests for data from the ground system 104 to aircraft 102. The requests may include the data format of the ground system 104 (e.g., B2 ADS-C format and/or other data format, etc.).

Further, the communication system 108 is configured to transmit the requested data from the aircraft 102 to the ground system 104. Here, the requested data may include the data format of the ground system 104 and/or a data format that is compatible with the data format used by/in the ground system 104 (e.g., B2 ADS-C format and/or other data format, etc.).

Figure 6:
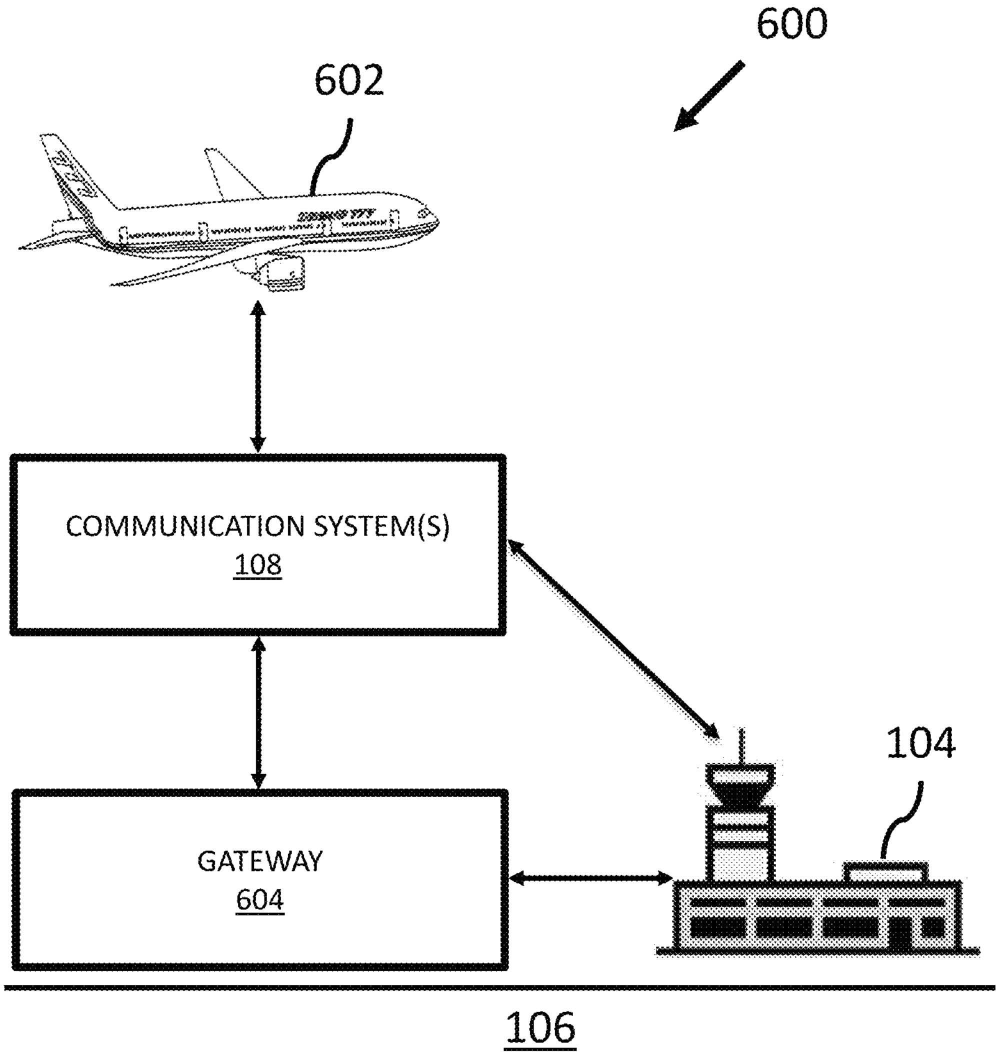
FIG. 6 is a schematic diagram of another embodiment of a system that can provide data from an aircraft in a compliant data format.

FIG. 6 is schematic block diagram illustrating another embodiment of a system 600 that can provide data from an aircraft 602 in a compliant data format. The system 600 includes a ground system 104 in communication with one or more communication systems 108 similar to the ground system 104 and the communication system(s) 108 of the system 100 discussed with reference to FIG. 1. At least in the embodiment illustrated in FIG. 6, the system 600 further includes, among other components, a gateway 604 coupled to and/or in communication with an aircraft 602 via the communication system(s) 108 and further coupled to and/or in communication with the ground system 104.

Similar to the aircraft 102 and the ground system 104 in system 100, the aircraft 602 and the ground system 104 in system 600 utilize different data formats and/or data formats that are communicatively incompatible with one another, at least when the aircraft 602 initially comes into contact with and/or attempts to begin communicating with the ground system 104. The various embodiments disclosed herein enable and/or allow the aircraft 602, via the gateway 604, to provide data stored in and/or generated in the aircraft 602 to the ground system 104 in the data format that is used by/in the ground system 104 and/or in a data format that is compatible with the data format used by/in and/or requested by the ground system 104.

In some embodiments, the aircraft 602 provides, via the gateway 604, the data stored in and/or generated in the aircraft 602 to the ground system 104 in response to receiving a request from the ground system 104 to provide the requested data to the ground system 104. In additional or alternative embodiments, the aircraft 602 automatically and/or automatedly provides, via the gateway 604, the data stored in and/or generated in the aircraft 602 to the ground system 104. In certain embodiments, the aircraft 602, via the gateway 604, automatically and/or automatedly provides the data stored in and/or generated in the aircraft 602 to the ground system 104 in response to determining, detecting, and/or identifying that a trigger event has occurred and/or is about to occur.

Additionally, the system 600 provides AOC to establish data connections between the aircraft 602 and the ground system 104 without requiring flight deck (e.g., pilot(s)) and ground operator interactions. Moreover, the gateway 604 is configured to provide a data service on the ground 106 for distributing the data from the aircraft 602 to one or more requesting users (e.g., one or more other ground systems 104) in a requested data format, which can include a unified and/or generic data format (e.g., B2 ADS-C format and/or other data format, etc.).

An aircraft 602 may include any suitable vehicle and/or device capable of flight similar to the aircraft 102 discussed with reference to FIG. 1. At least in the example embodiment illustrated in FIG. 6, the aircraft 602 is a jet airplane manufactured by The Boeing Company of Chicago, Illinois, although the discussion herein is applicable to any and/or all of the possible embodiments of an aircraft 602.

Figure 7:
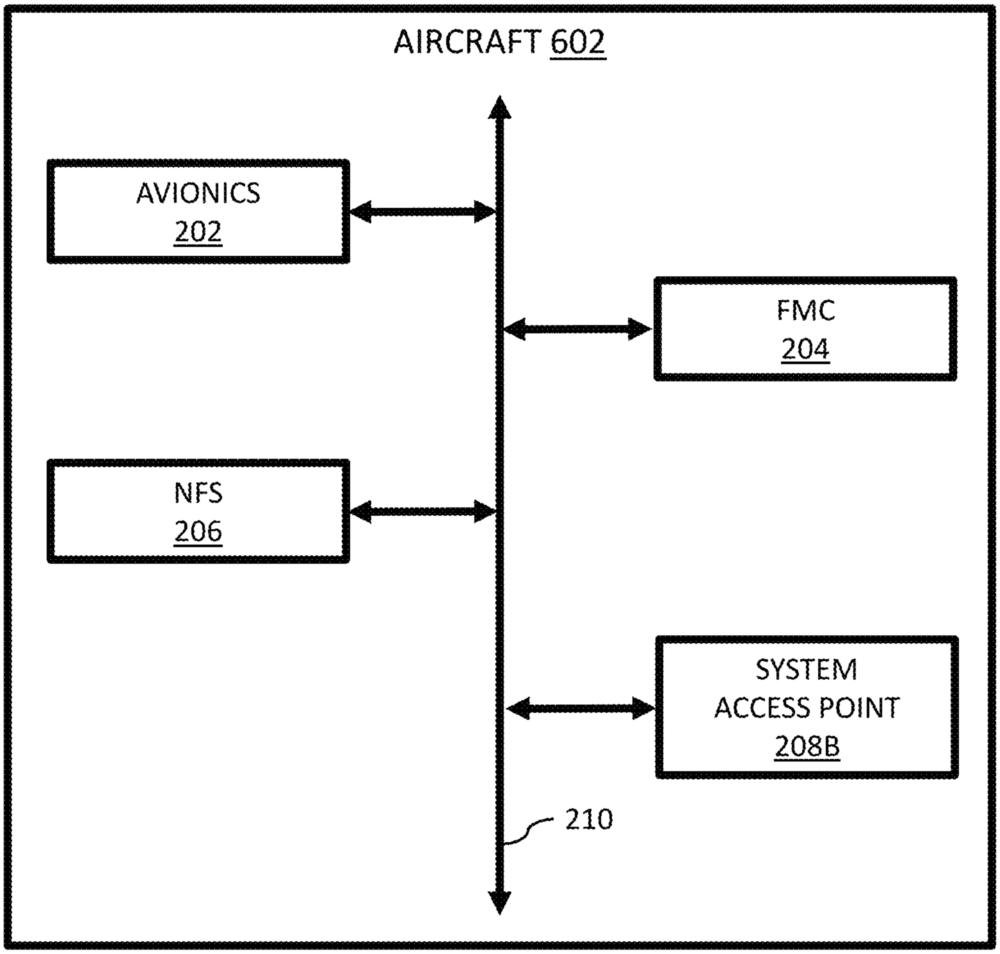
FIG. 7 is a schematic block diagram of one embodiment of an aircraft included in the system of FIG. 6.

FIG. 7 illustrates a block diagram of one embodiment of an aircraft 602 included in the system 600 of FIG. 6. At least in the embodiment illustrated in FIG. 7, the aircraft 602 includes a set of avionics 202, an FMC 204, an NFS 206, and a system access point 208B coupled to and/or in communication with one another via a bus 210 similar to the various embodiments of the avionics 202, FMC 204, NFS 206, system access point 208A, and bus 210 in aircraft 102 discussed with reference to FIG. 2.

Figure 8:
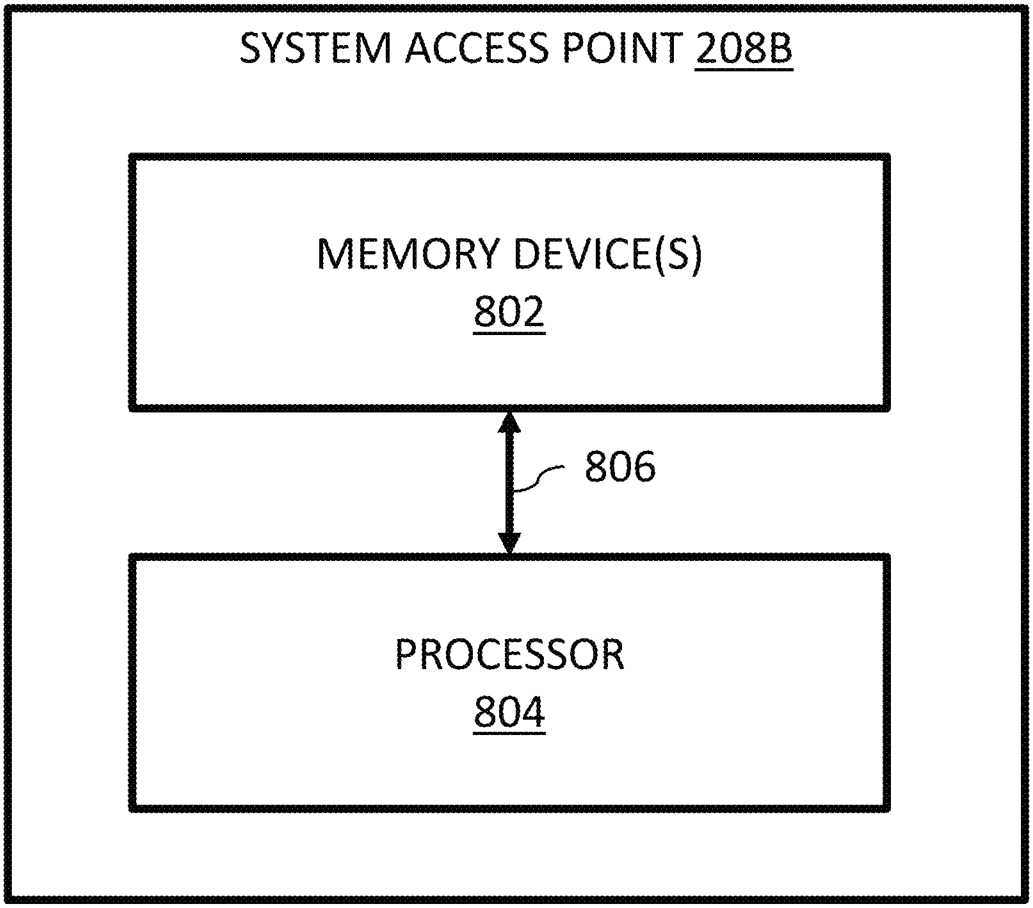
FIG. 8 is a schematic block diagram of one embodiment of a system access point included in the aircraft of FIG. 7.

Referring to FIG. 8, one embodiment of a system access point 208B is illustrated. At least in the illustrated embodiment, the system access point 208B includes, among other components and/or features, a set of memory devices 802 and a processor 804 coupled to and/or in communication with one another via a bus 806 (e.g., a wired and/or wireless bus 306).

A set of memory devices 802 may include any suitable quantity of memory devices 802. Further, a memory device 802 may include any suitable type of device and/or system that is known or developed in the future that can store computer-useable and/or computer-readable code. In various embodiments, a memory device 802 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 804).

A memory device 802, in some embodiments, includes volatile computer-readable storage media. For example, a memory device 802 may include random-access memory (RAM), including dynamic RAM (DRAM), synchronous dynamic RAM (SDRAM), and/or static RAM (SRAM). In other embodiments, a memory device 802 may include non-volatile computer-readable storage media. For example, a memory device 802 may include a hard disk drive, a flash memory, and/or any other suitable non-volatile computer storage device that is known or developed in the future. In various embodiments, a memory device 802 includes both volatile and non-volatile computer-readable storage media.

Figure 9:
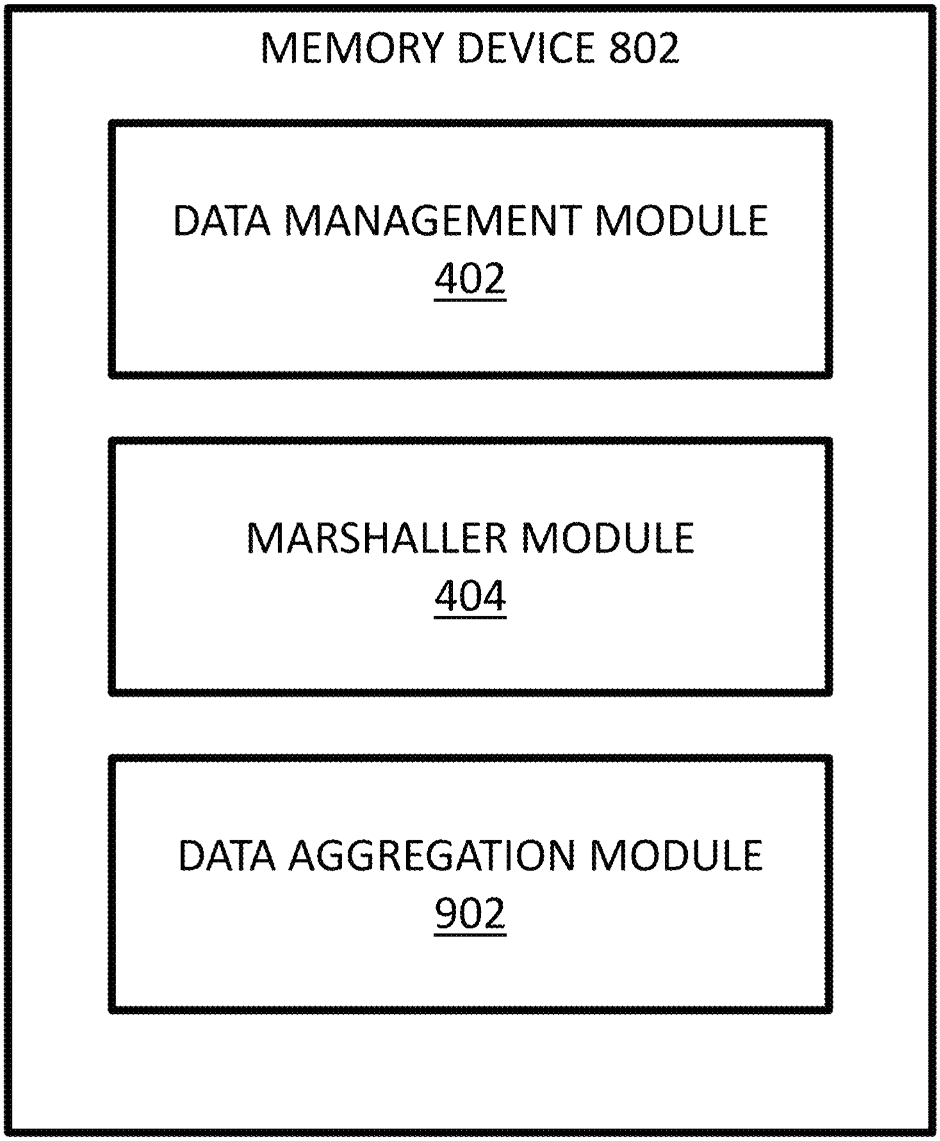
FIG. 9 is a schematic block diagram of one embodiment of a memory device included in the system access point of FIG. 8.

With reference now to FIG. 9, a schematic block diagram of one embodiment of a memory device 802 is illustrated. The memory device 802 includes a data management module 402 and a marshaller module 404 configured to operate/function similar to the data management module 402 and marshaller module 404 included in the memory device 302 discussed with reference to FIG. 4. At least in the embodiment illustrated in FIG. 9, the memory device 802 further includes, among other components, a data aggregation module 902 in which the data management module 402, marshaller module 404, and data aggregation module 902 are each configured to cooperatively operate/function with one another when executed by the processor 804 to provide data from an aircraft 602 and/or facilitate providing data from the aircraft 602 in a compliant data format.

A data aggregation module 902 is configured to receive the data retrieved by the marshaller module 404. Further, a data aggregation module 902 may include any suitable hardware and/or software that can combine the data received from the marshaller module 404.

In some embodiments, the data aggregation module 902 is configured to enforce one or more user-level protocol rules for an aircraft-side application. The user-level protocol(s) may include any suitable user-level protocol(s) that are known or developed in the future. Similarly, the rule(s) for the user-level protocol(s) may include any suitable rule(s) that are known or developed in the future. Moreover, the aircraft-side application(s) may include any suitable aircraft-side application(s) that are known or developed in the future.

The data aggregation module 902, in various embodiments, is configured to transmit the combined data to the gateway 604. As discussed above, the combined data may be transmitted to the gateway 604 in response to one or more requests for the data from the ground system 104 and/or automatically/automatedly transmitted to the gateway 604. The combined data may automatically/automatedly transmitted to the gateway 604 in response to detecting the occurrence of a trigger event and/or determining that a trigger event is about to occur, as discussed elsewhere herein.

Referring back to FIG. 8, a processor 804 may include any suitable non-volatile/persistent hardware and/or software configured to perform and/or facilitate performing functions and/or operations for providing data from an aircraft 602 in a compliant data format. In various embodiments, the processor 804 includes hardware and/or software for executing instructions in one or more modules and/or applications that can perform and/or facilitate performing functions and/or operations for providing data from an aircraft 602 in a compliant data format. The modules and/or applications executed by the processor 804 for providing data from an aircraft 602 in a compliant data format can be stored on and executed from one or more memory devices 802 and/or from the processor 804.

Figure 10:
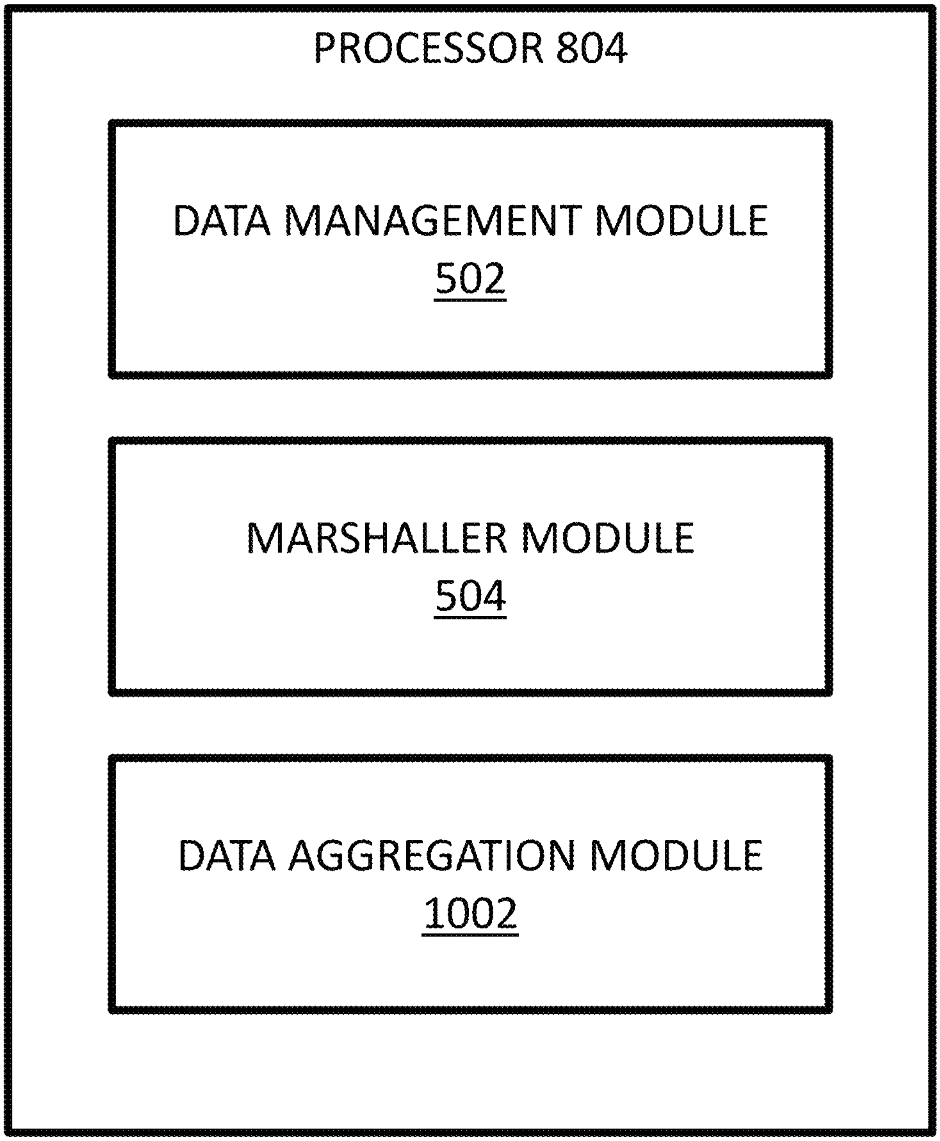
FIG. 10 is a schematic block diagram of one embodiment of a processor included in the system access point of FIG. 8.

With reference to FIG. 10, a schematic block diagram of one embodiment of a processor 804 is shown. At least in the illustrated embodiment, the processor 804 includes, among other components, a data management module 502, a marshaller module 504, and a data aggregation module 1002 that are each configured to cooperatively operate/function with one another when executed by the processor 804 to provide data from an aircraft 602 in a compliant data format similar to the data management module 402, marshaller module 404, and data aggregation module 902 discussed with reference to the memory device 802 illustrated in FIG. 9.

Referring again to FIG. 6, a gateway 604 is coupled to and/or in communication with the aircraft 602 and the ground system 104 and may include any suitable hardware and/or software capable of providing data stored in and/or generated in an aircraft 602 in a compliant format, as discussed herein. That is, various embodiments of the gateway 604 are configured to provide data stored in and/or generated in an aircraft 602 to the ground system 104 in the format used by/in the ground system 104 and/or in a data format that is compliant with the data format used by/in the ground system 104.

Figure 11:
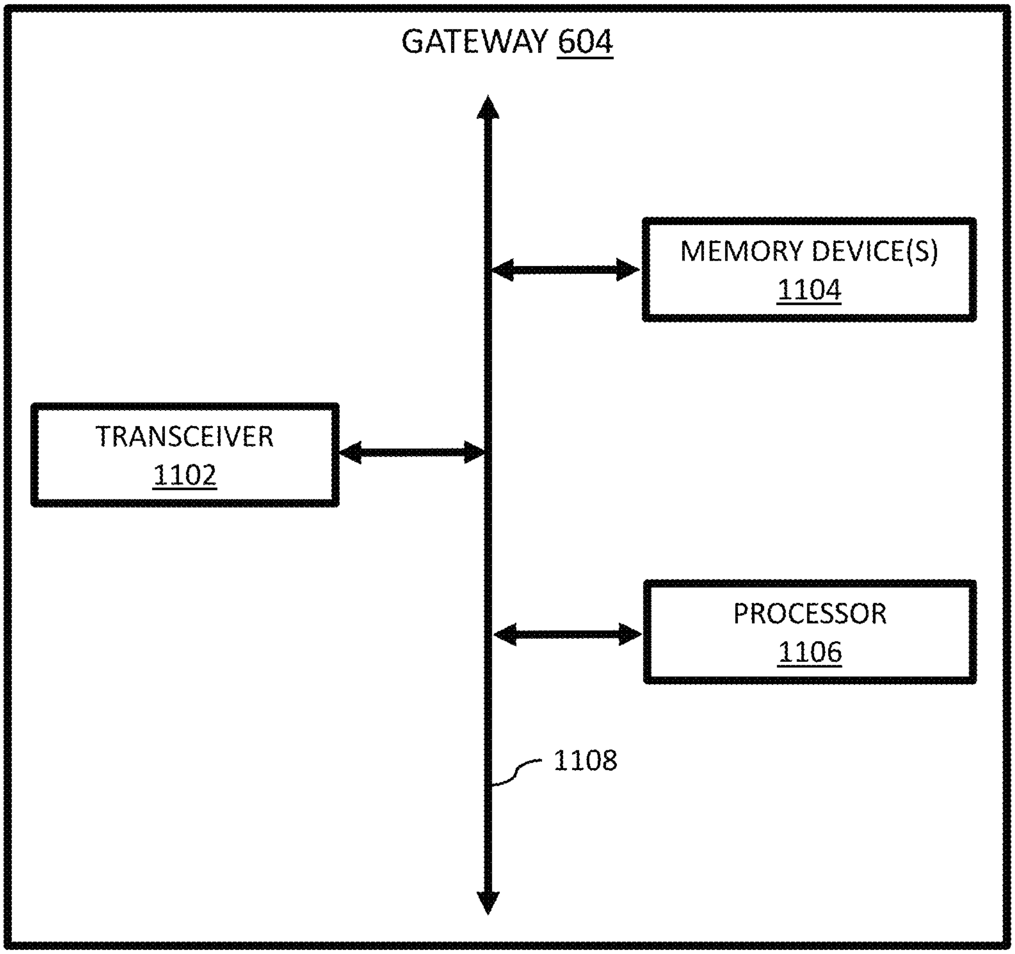
FIG. 11 is a schematic block diagram of one embodiment of a gateway included in the system of FIG. 6.

With reference to FIG. 11, one embodiment of a gateway 604 is illustrated. At least in the embodiment illustrated in FIG. 11, a gateway 604 includes, among other components and/or features, a transceiver 1102, a set of memory devices 1104, and a processor 1106 coupled to an/or in communication with one another via a bus 1108 (e.g., a wired and/or wireless bus).

A transceiver 1102 may include any transceiver that is known or developed in the future. That is, a transceiver 1102 may include any suitable hardware and/or software that can enable and/or allow the gateway 604 to communicate with the aircraft 602 and one or more ground networks 104.

In various embodiments, the transceiver 1102 is configured to receive data from an aircraft 602 in a particular format that is used by/in the aircraft 602. The particular format may be any suitable format that is known or developed in the future (e.g., a standard format, etc.). In some embodiments, the data received by the transceiver 1102 from the aircraft 602 includes data retrieved and combined from multiple sources in the aircraft 602, as discussed elsewhere herein.

In further embodiments, the transceiver 1102 is configured to transmit the combined data in a data format that is used by/in the ground system 104 and/or is compatible with the data format that is used by/in the ground system 104. The data format of the ground system 104 may be any suitable format that is known or developed in the future (e.g., a B2 ADS-C format and/or other data format, etc., among other data formats that are possible and contemplated herein), as discussed elsewhere herein. In some embodiments, the data transmitted by the transceiver 1102 to the ground system 104 includes a data format that is different than and/or incompatible with the data format of the combined data received from the aircraft 602, as discussed elsewhere herein.

A set of memory devices 1104 may include any suitable quantity of memory devices 1104. Further, a memory device 1104 may include any suitable type of device and/or system that is known or developed in the future that can store computer-useable and/or computer-readable code. In various embodiments, a memory device 1104 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 1106).

A memory device 1104, in some embodiments, includes volatile computer-readable storage media. For example, a memory device 302 may include random-access memory (RAM), including dynamic RAM (DRAM), synchronous dynamic RAM (SDRAM), and/or static RAM (SRAM). In other embodiments, a memory device 302 may include non-volatile computer-readable storage media. For example, a memory device 302 may include a hard disk drive, a flash memory, and/or any other suitable non-volatile computer storage device that is known or developed in the future. In various embodiments, a memory device 302 includes both volatile and non-volatile computer-readable storage media.

Figure 12:
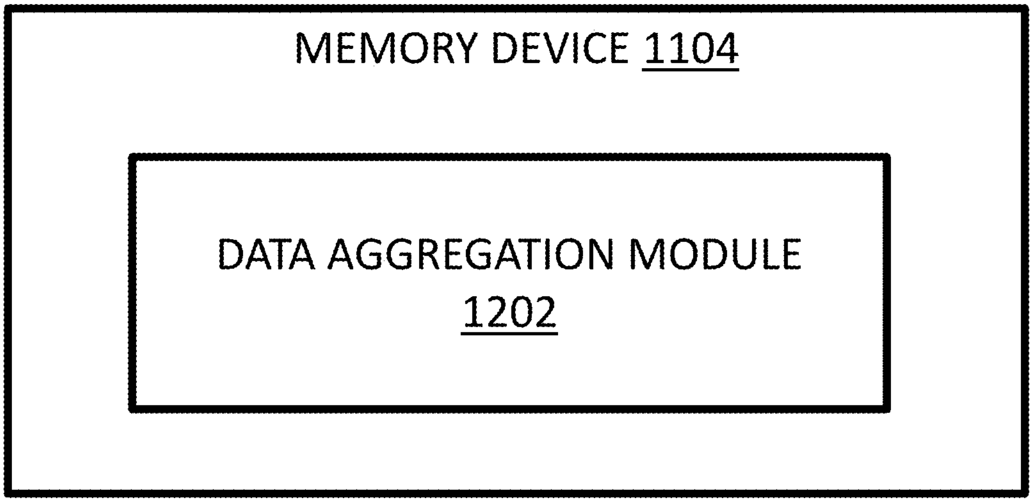
FIG. 12 is a schematic block diagram of one embodiment of a memory device included in the gateway of FIG. 11.

With reference now to FIG. 12, a schematic block diagram of one embodiment of a memory device 1104 is illustrated. At least in the embodiment illustrated in FIG. 12, the memory device 1104 includes, among other components, a data aggregation module 1202 that is configured to provide data from an aircraft 602 and/or facilitate providing data from the aircraft 602 in a compliant data format.

A data aggregation module 1202 is configured to receive the data (e.g., aircraft data) that has been combined by the aircraft 602 (e.g., via the data aggregation module 902 and/or data aggregation module 1002). Further, a data aggregation module 1202 may include any suitable hardware and/or software that can further process the combined data requested by the ground system 104 and/or the combined data that is to be automatically/automatedly transmitted to the ground system 104.

In further processing the combined data received from the aircraft 602 (e.g., from the data aggregation module 902 and/or data aggregation module 1002), the data aggregation module 1202 is configured to translate the combined data from the data format used in/by the aircraft 602 to the data format used in/by the ground system 104. In other words, the data aggregation module 1202 is configured to translate the data format used/stored in the aircraft 102 to the data format used in/by the ground system 104 and/or to a data format that is compatible with the data format used in/by the ground system 104.

As discussed elsewhere herein, the data format of the combined data may include any suitable data format that is known or developed in the future. That is, the data format of the combined data may include a standard format, among other data formats that are possible and contemplated herein.

The data format of the ground system 104 may include any suitable data format that is known or developed in the future. Examples data formats that the ground system 104 includes/uses include, but are not limited to, a B2 ADS-C format and/or other data format, etc., among other data formats that are possible and contemplated herein.

As such, certain embodiments of the data aggregation module 1202 are configured to translate the combined data from the standard format used in/by the aircraft 602 to the B2 ADS-C format used by the ground system 104. In certain additional or alternative embodiments, the data aggregation module 1202 is configured to translate the combined data from the standard format used in/by the aircraft 602 to any other data format. Other embodiments of the data aggregation module 1202 are configured to translate the combined data from the standard format used by/in the aircraft 602 to one or more other data formats used by/in a particular ground system 104.

The data aggregation module 1202, in various embodiments, is configured to transmit (via the transceiver 1102) the data that has been combined and translated to the data format used by/in the ground system 104 and/or that is compatible with the data format used by/in the ground system 104 to the ground system 104. As discussed above, the combined and translated data may be transmitted to the ground system 104 in response to one or more requests for the data from the ground system 104 and/or automatically/automatedly transmitted to the ground system 104. The combined and translated data may automatically/automatedly transmitted to the ground system 104 in response to detecting the occurrence of a trigger event and/or determining that a trigger event is about to occur, as discussed elsewhere herein.

Referring back to FIG. 11, a processor 1106 may include any suitable non-volatile/persistent hardware and/or software configured to perform and/or facilitate performing functions and/or operations for providing data from an aircraft 602 in a compliant data format. In various embodiments, the processor 1106 includes hardware and/or software for executing instructions in one or more modules and/or applications that can perform and/or facilitate performing functions and/or operations for providing data from an aircraft 602 in a compliant data format. The modules and/or applications executed by the processor 1106 for providing data from an aircraft 602 in a compliant data format can be stored on and executed from one or more memory devices 1104 and/or from the processor 1106.

Figure 13:
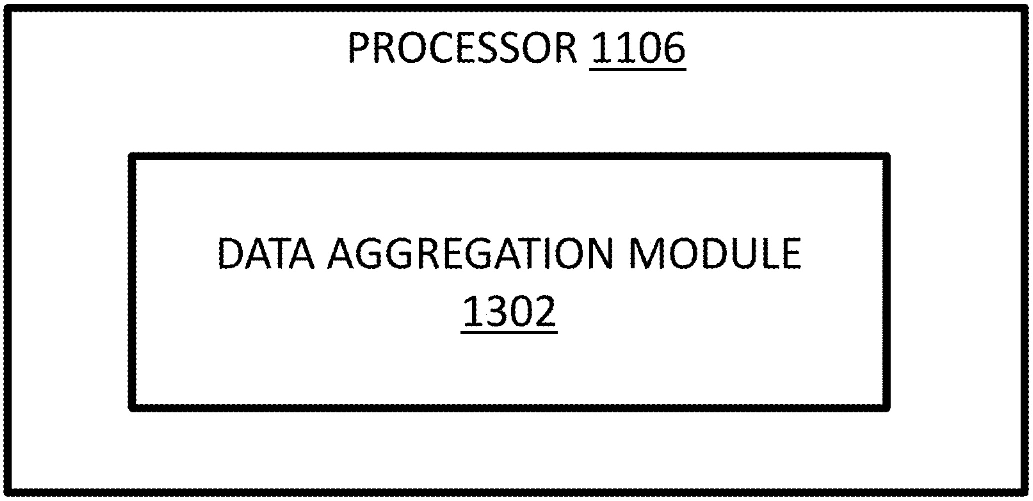
FIG. 13 is a schematic block diagram of one embodiment of a processor included in the gateway of FIG. 11.

With reference to FIG. 13, a schematic block diagram of one embodiment of a processor 1106 is shown. At least in the illustrated embodiment, the processor 1106 includes, among other components, a data aggregation module 1302 that is configured to provide data from an aircraft 602 in a compliant data format similar to the data aggregation module 1202 discussed with reference to the memory device 1104 illustrated in FIG. 12.

Figure 14:
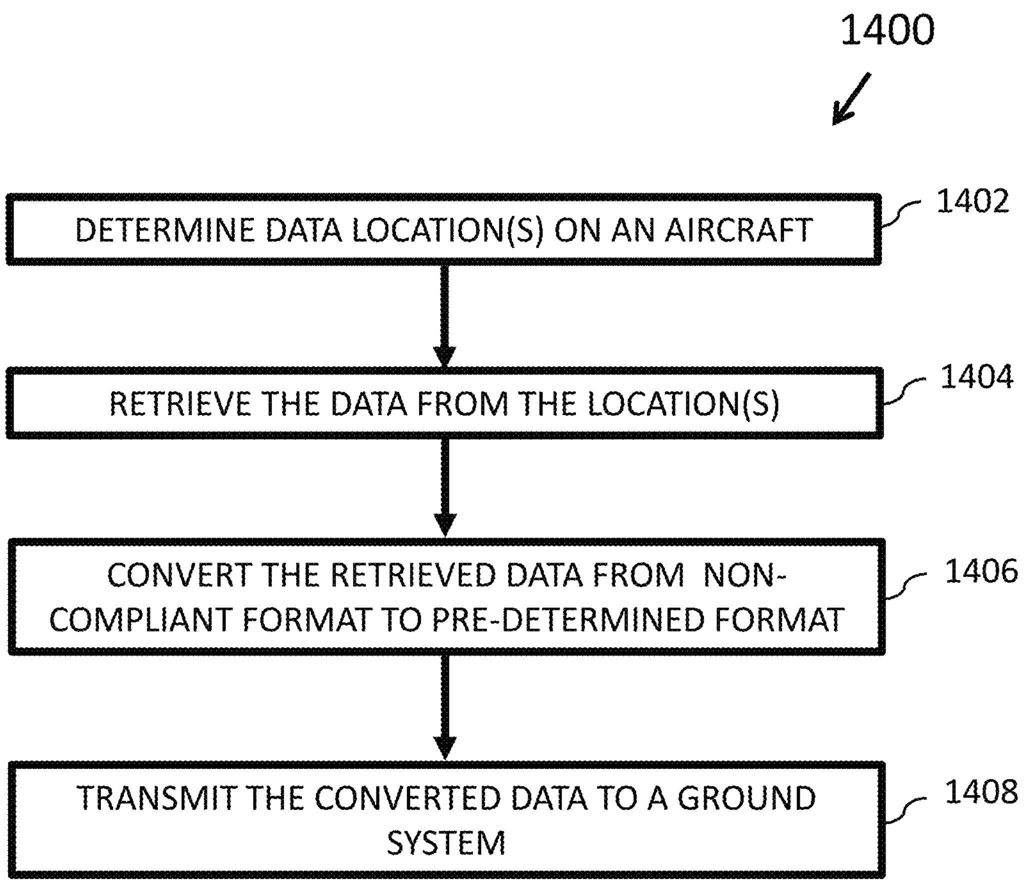
FIG. 14 is a schematic flow diagram of one embodiment of a method for providing data from an aircraft in a compliant data format.

FIG. 14 is a schematic flow chart diagram illustrating one embodiment of a method 1400 for providing data from an aircraft 102 in a compliant data format. At least in the illustrated embodiment, the method 1400 begins by a processor (e.g., processor 304) determining one or more locations on an aircraft 102 where data requested from a ground system 104 is stored, generated, and/or can be generated (block 1402). The requested data may be in a data format that is utilized on the aircraft 102 and may include any suitable data and/or data format, as discussed elsewhere herein. Further, the data format of the data on the aircraft 102 is different from and/or incompatible with the data format of the ground system 104, as further discussed elsewhere herein.

The method 1400 further includes the processor 304 retrieving the data from the determined location(s) on the aircraft 102 (block 1404). The processor 304 converts and/or translates the retrieved (and combined) data from the data format used in/by the aircraft 102 to the data format used by/in the ground system 104 and/or to a data format that is compatible with the data format used by/in the ground system 104 (block 1406). The data format can be converted/translated from any suitable data format to any other suitable data format, as discussed elsewhere herein.

The data with the converted/translated data format is transmitted from the aircraft 102 to the ground system 104 (block 1406). The method 1400 may be initiated in response to the aircraft 102 receiving a request for the data from the ground system 104 and/or initiated automatically/automatedly by the processor 304, which can be in response to a trigger event, as discussed elsewhere herein, respectively.

Figure 15:
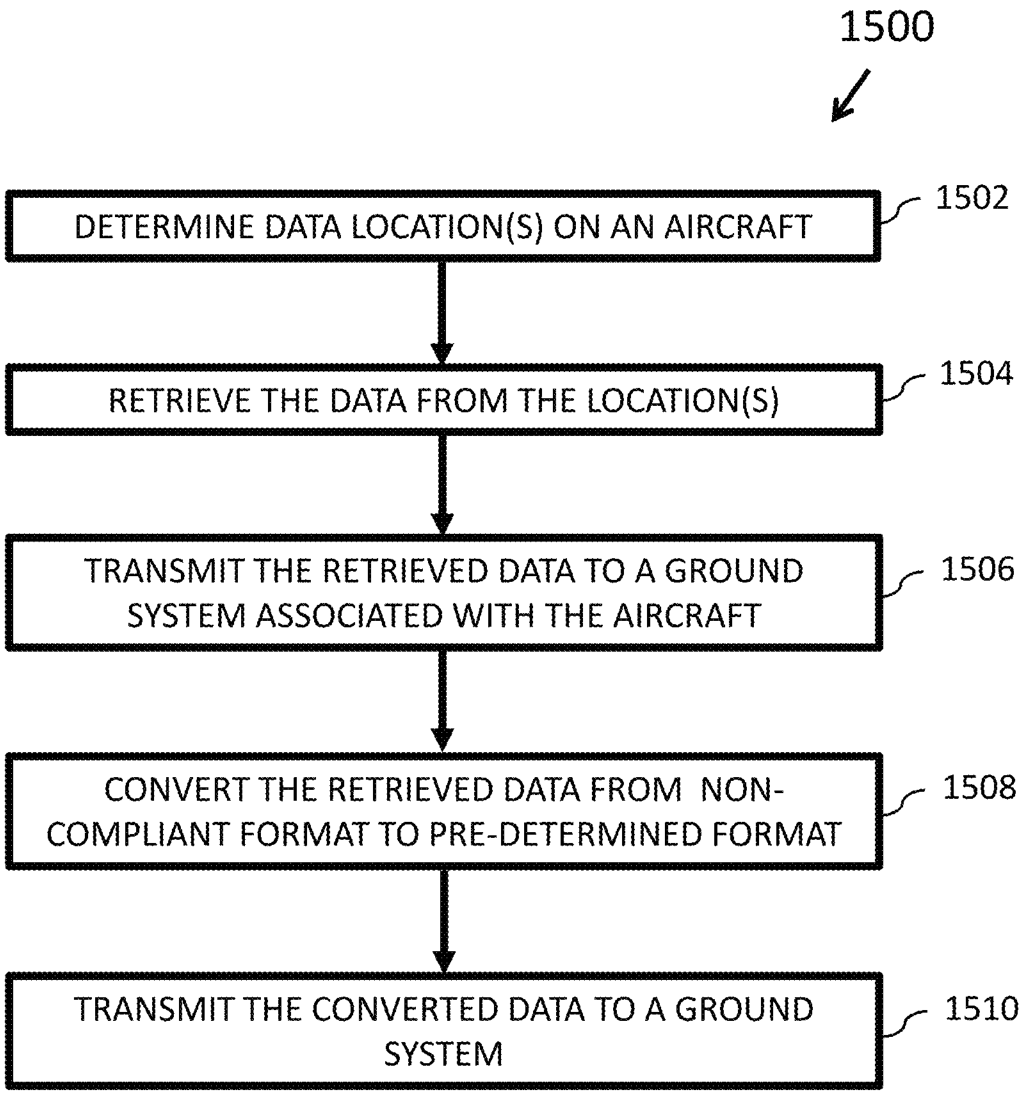
FIG. 15 is a schematic flow diagram of another embodiment of a method for providing data from an aircraft in a compliant data format.

FIG. 15 is a schematic flow chart diagram illustrating another embodiment of a method 1500 for providing data from an aircraft 602 in a compliant data format. At least in the illustrated embodiment, the method 1500 begins by a processor (e.g., processor 804) determining one or more locations on an aircraft 602 where data requested from a ground system 104 is stored, generated, and/or can be generated (block 1502). The requested data may be in a data format that is utilized on the aircraft 602 and may include any suitable data and/or data format, as discussed elsewhere herein. Further, the data format of the data on the aircraft 602 is different from and/or incompatible with the data format of the ground system 104, as further discussed elsewhere herein.

The method 1500 further includes the processor 804 retrieving the data from the determined location(s) on the aircraft 602 (block 1504). The processor 804 transmits the retrieved data to a ground system (e.g., a processor 1106 in a gateway 604) associated with the aircraft 602 (block 1506).

The processor 1106 converts and/or translates the data received from the aircraft 602 from the data format used in/by the aircraft 602 to the data format used by/in the ground system 104 and/or to a data format that is compatible with the data format used by/in the ground system 104 (block 1508). The data format can be converted/translated from any suitable data format to any other suitable data format, as discussed elsewhere herein.

The data with the converted/translated data format is transmitted from the gateway 604 to the ground system 104 (block 1508). The method 1500 may be initiated in response to the aircraft 602 receiving a request for the data from the ground system 104 and/or initiated automatically/automatedly by the processor 804, which can be in response to a trigger event, as discussed elsewhere herein, respectively.

In summary, the various embodiments disclosed herein provide more flexibility in adapting to specific application and/or specific network protocols (e.g., Baseline 2 (B2) and/or Aeronautical Telecommunications Network/Open Systems Interconnection (ATN/OSI), respectively). The various embodiments further allow and/or enable key capabilities (e.g. the use of Extended Projected Profile (EPP) information, etc.) that may be required by a ground system 104 to be supported by an aircraft 102/602 without having to perform a process of implementing extensive changes to the avionics 202. From a ground system 104 perspective, the aircraft 102/602 is compliant to the data format requirements of the ground system 104. That is, the various embodiments can implement a message exchange selection function, which provides the capability to use the specific communications protocols and/or links required/requested by the ground system 104 and/or the data from the aircraft 102/602 being provided, which may be the case of specific application protocols (e.g., B2). Additionally, the various embodiments can deploy an optional ground-based data exchange service (e.g., via a gateway 604) that can allow multiple ground systems 104 with proper authorization to access the data from the aircraft 602 via contract, subscription, and/or other methods.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing data in a pre-determined format with minimal impact from an aircraft to an interested entity, the system comprising:
- a data processing system configured to store executable code to:
  - receive a request for data from the interested entity, wherein the data is otherwise unavailable to the interested entity via pre-existing technology,
  - determine, in real-time, one or more first devices on the aircraft where the data is stored in a format that is non-compliant with the pre-determined format, one or more second devices on the aircraft where the data can be generated in the format that is non-compliant with the pre-determined format, or a combination thereof, and
  - retrieve the data in the format that is non-compliant with the pre-determined format from the at least one of the one or more first devices and the one or more second devices;
- wherein:
  - at least two portions of the data include different formats that are each non-compliant with the pre-determined format; and
  - the executable code is further configured to:
    - convert the at least two portions including the different formats that are each non-compliant with the pre-determined format to the pre-determined format, and
    - merge the at least two portions of the requested data in retrieving the requested data for transmission to the interested entity.

2. The system of claim 1, wherein:
- the executable code is further configured to determine a content of the received data; and
- the content of the received data is determined utilizing at least one of predictive analysis, machine learning, and artificial intelligence.

3. The system of claim 1, wherein:
- the request for the data is received from a system of the interested entity; and
- the executable code is further configured to:
  - convert, in real-time, the retrieved data into the pre-determined format, wherein the pre-determined format adheres to a protocol of the interested entity, and
  - transmit the converted data with the pre-determined format to the system of the interested entity.

4. The system of claim 3, wherein:
- the converted data comprises at least one of aircraft configuration data or aircraft flight data; and
- the converted data is transmitted to the system of the interested entity while one of the aircraft is in flight or the aircraft is on a ground.

5. The system of claim 1, wherein:
- the request for the data is received from a ground system associated with the aircraft; and
- the executable code is further configured to transmit the retrieved data to the ground system associated with the aircraft.

6. The system of claim 5, wherein the ground system comprises:
- a second data processing system configured to store executable code configured to:
  - receive the retrieved data from the data processing system, convert, in real-time, the retrieved data into the pre-determined format, wherein the pre-determined format adheres to a protocol of the interested entity, and
transmit the converted data with the pre-determined format to a second ground system of the interested entity.

7. The system of claim 6, wherein:
the converted data comprises at least one of aircraft configuration data or aircraft flight data; and
the converted data is transmitted from the ground system associated with the aircraft to the second ground system of the interested entity while one of the aircraft is in flight or the aircraft is on a ground.

8. The system of claim 6, wherein the second data processing system forms at least a portion of a cloud-based system.

9. The system of claim 1, wherein:
the aircraft comprises avionics; and
the data processing system is configured to be one of located within the avionics and located external to the avionics.

10. The system of claim 1, wherein the pre-determined format comprises a Baseline 2 Automatic Dependent Surveillance-Contract (B2 ADS-C) format or other applicable format.

11. The system of claim 1, wherein the data processing system is further configured to determine that at least two first devices on the aircraft include different portions of the data that are each non-compliant with the pre-determined format, to convert the different portions of the data to the pre-determined format, and to merge the different portions of the data with the pre-determined format for transmission to the interested entity.

12. The system of claim 1, wherein the data processing system is further configured to determine that at least two second devices on the aircraft generate different portions of the data that are each non-compliant with the pre-determined format, to convert the different portions of the data to the pre-determined format, and to merge the different portions of the data with the pre-determined format for transmission to the interested entity.

13. An apparatus for providing data in a pre-determined format with minimal impact from an aircraft to an interested entity, the apparatus comprising:
a data management module that receives a request for the data from the interested entity and determines, in real-time, one or more first devices on the aircraft where the data is stored in a format that is non-compliant with the pre-determined format, one or more second devices on the aircraft where the data can be generated in the format that is non-compliant with the pre-determined format, or a combination thereof;
a marshaller module that retrieves the data in the format that is non-compliant with the pre-determined format from the at least one of the one or more first devices and the one or more second devices; and
a data aggregation module that:
converts, in real-time, the retrieved data into the pre-determined format, wherein the pre-determined format adheres to a protocol of the interested entity, and
transmits the converted data with the pre-determined format to a ground system of the interested entity;
wherein the data aggregation module is further configured to at least one of:
determine that at least two first devices on the aircraft include different portions of the data that are each non-compliant with the pre-determined format, convert the different portions of the data to the pre-determined format, and merge the different portions of the data with the pre-determined format for transmission to the interested entity; or
determine that at least two second devices on the aircraft generate different portions of the data that are each non-compliant with the pre-determined format, convert the different portions of the data to the pre-determined format, and merge the different portions of the data with the pre-determined format for transmission to the interested entity.

14. The apparatus of claim 13, wherein the marshaller module is further configured to determine a content of the data utilizing at least one of predictive analysis, machine learning, and artificial intelligence.

15. The apparatus of claim 13, wherein the data aggregation module is configured to transmit the converted data with the pre-determined format to a ground system of the interested entity while the aircraft is one of in flight or on a ground.

16. The apparatus of claim 13, wherein:
at least two portions of the data include different formats that are each non-compliant with the pre-determined format; and
the data aggregation module is further configured to:
convert the at least two portions including the different formats that are each non-compliant with the pre-determined format to the pre-determined format, and
merge the at least two portions of the requested data in retrieving the requested data for transmission to the interested entity.

17. A method for providing data in a pre-determined format with minimal impact from an aircraft to an interested entity, the apparatus comprising:
receiving a request for the data from the interested entity;
determining, by a processor in real-time, one or more locations of the data on the aircraft, the one or more locations comprising one or more first devices on the aircraft where the data is stored in a format that is non-compliant with the pre-determined format, one or more second devices on the aircraft where the data can be generated in the format that is non-compliant with the pre-determined format, or a combination thereof;
retrieving from the one or more locations on the aircraft, the data in the format that is non-compliant with the pre-determined format from the at least one of the one or more first devices and the one or more second devices;
converting, in real-time, the retrieved data into the pre-determined format, wherein the pre-determined format adheres to a protocol of the interested entity;
transmitting the converted data with the pre-determined format to a ground system of the interested entity; and
at least one of:
determining that at least two first devices on the aircraft include different portions of the data that are each non-compliant with the pre-determined format, converting the different portions of the data to the pre-determined format, and merging the different portions of data with the pre-determined format for transmission to the interested entity; or
determining that at least two second devices on the aircraft generate different portions of the data that are each non-compliant with the pre-determined format, converting the different portions of the data to the pre-determined format, and merging the different portions of the data with the pre-determined format for transmission to the interested entity.

18. The method of claim 17, further comprising utilizing at least one of predictive analysis, machine learning, and artificial intelligence to determine a content of the data.

19. The method of claim 17, wherein:

at least two portions of the data include different formats that are each non-compliant with the pre-determined format; and the method further comprises:

converting the at least two portions including the different formats that are each non-compliant with the pre-determined format to the pre-determined format, and merging the at least two portions of the requested data in retrieving the requested data for transmission to the interested entity.

20. The method of claim 17, wherein the converted data comprises at least one of aircraft configuration data or aircraft flight data.

* * * * *